July 4, 1950 — H. G. MUELLER — 2,514,287
COMPOUND ENGINE CONVERSION UNIT
Filed Oct. 10, 1946 — 14 Sheets-Sheet 1
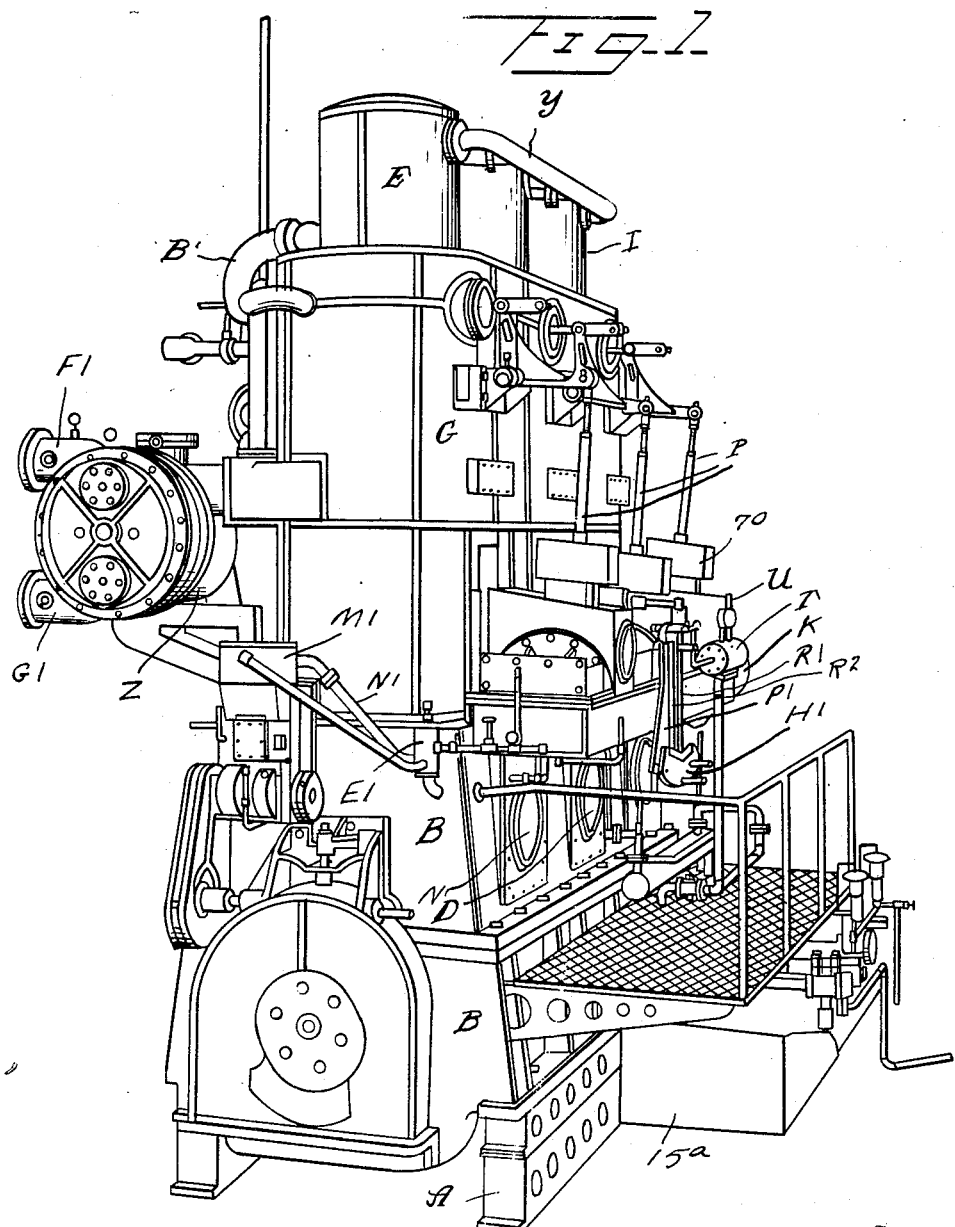
Inventor
H. G. Mueller
By Kimmel & Crowell
Attorney

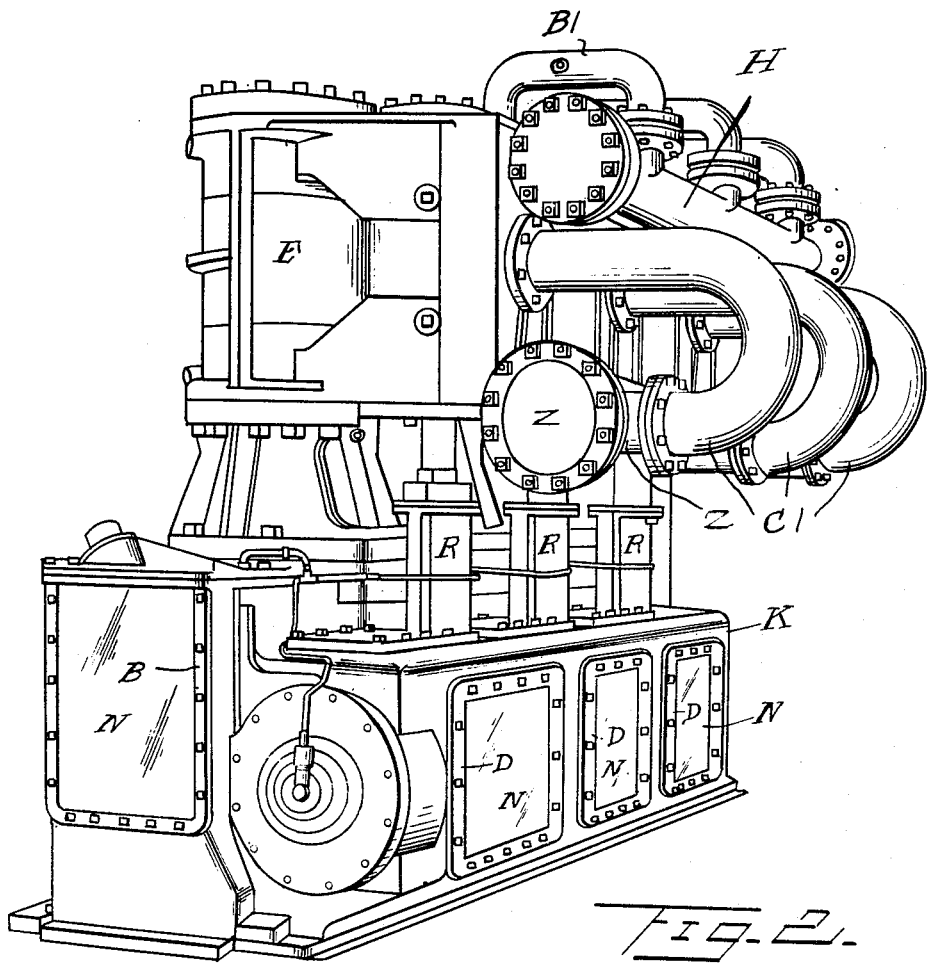

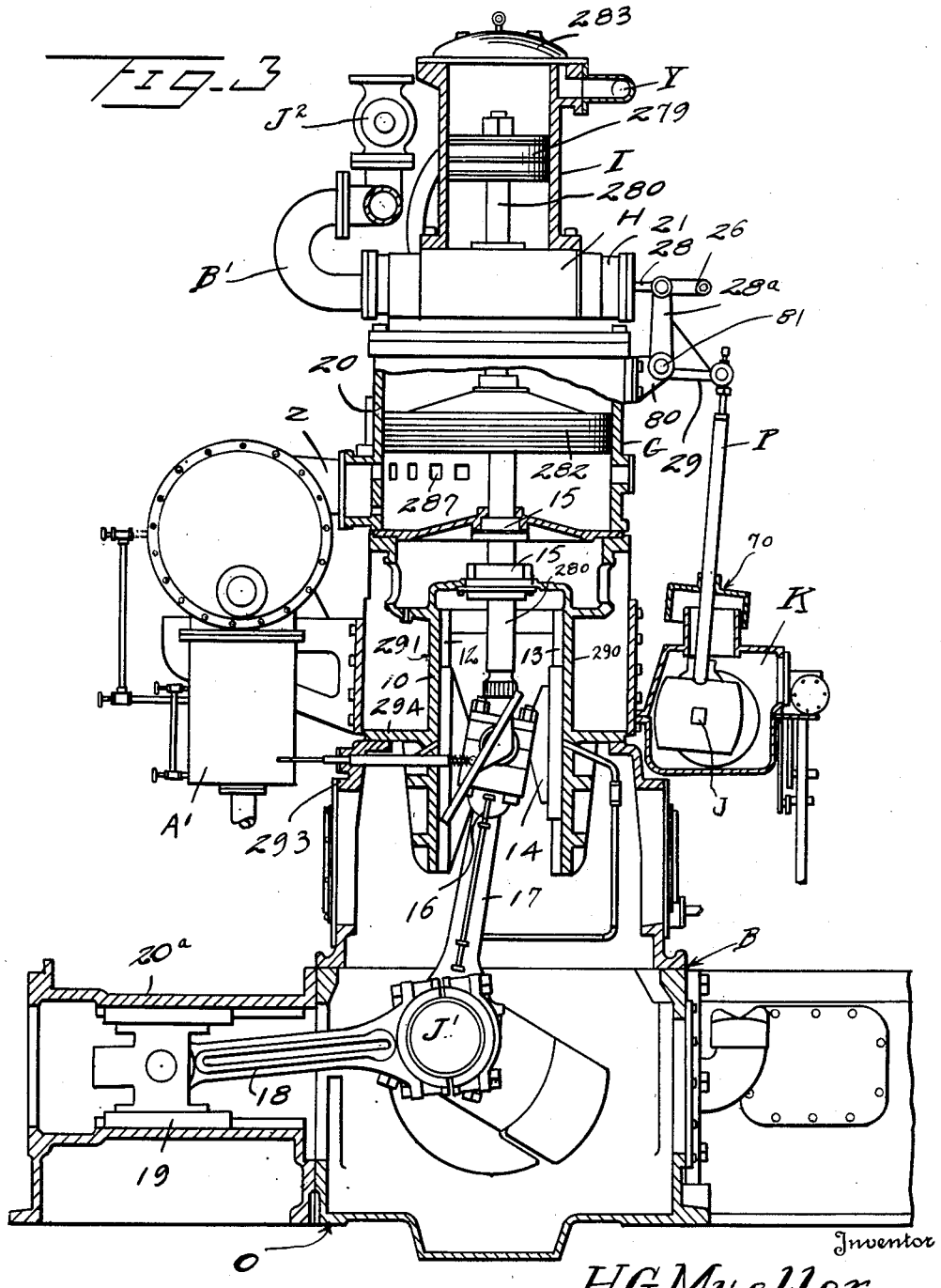

July 4, 1950 H. G. MUELLER 2,514,287
COMPOUND ENGINE CONVERSION UNIT
Filed Oct. 10, 1946 14 Sheets-Sheet 4
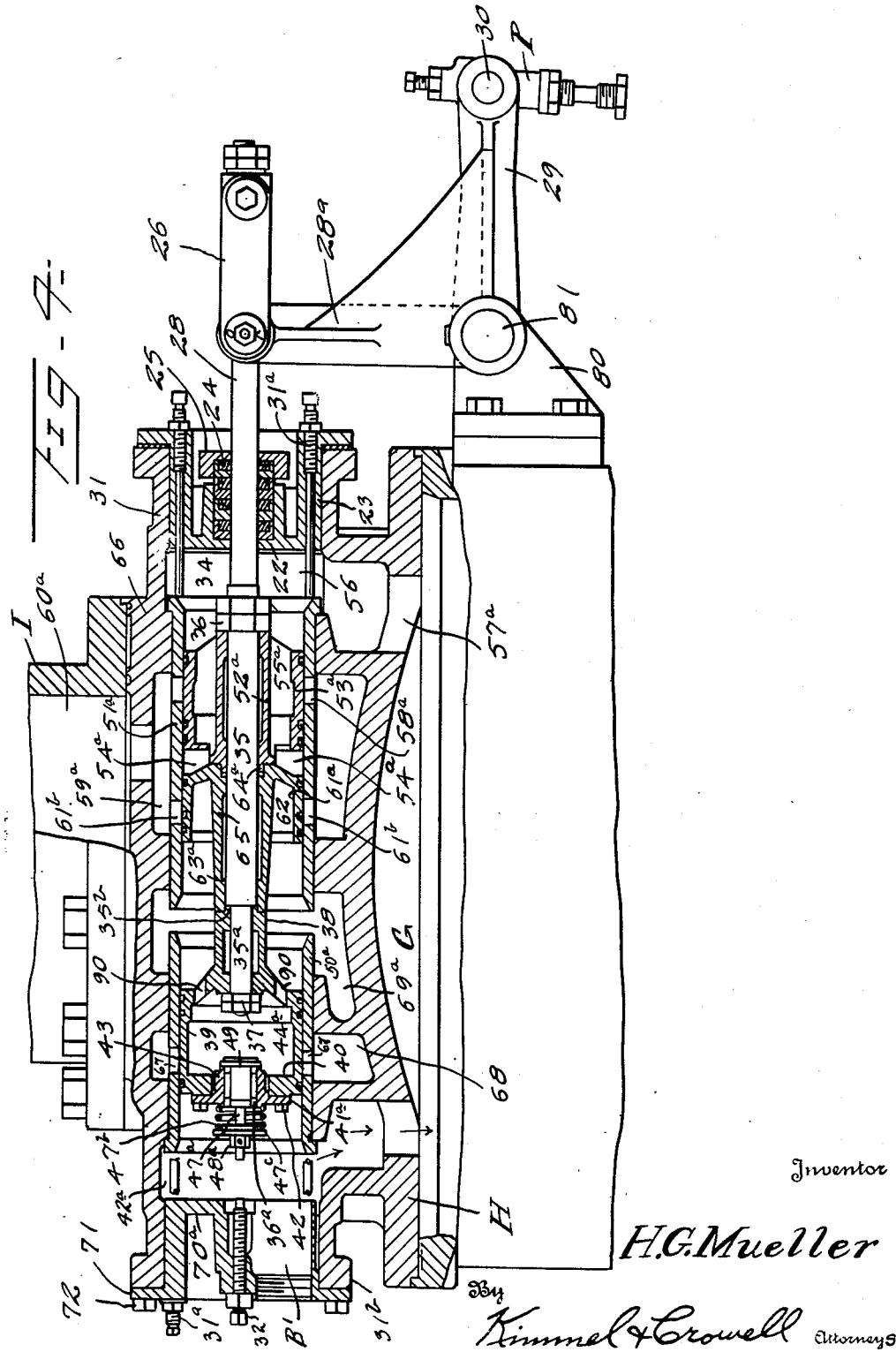
Inventor
H.G.Mueller
By
Kimmel & Crowell Attorneys

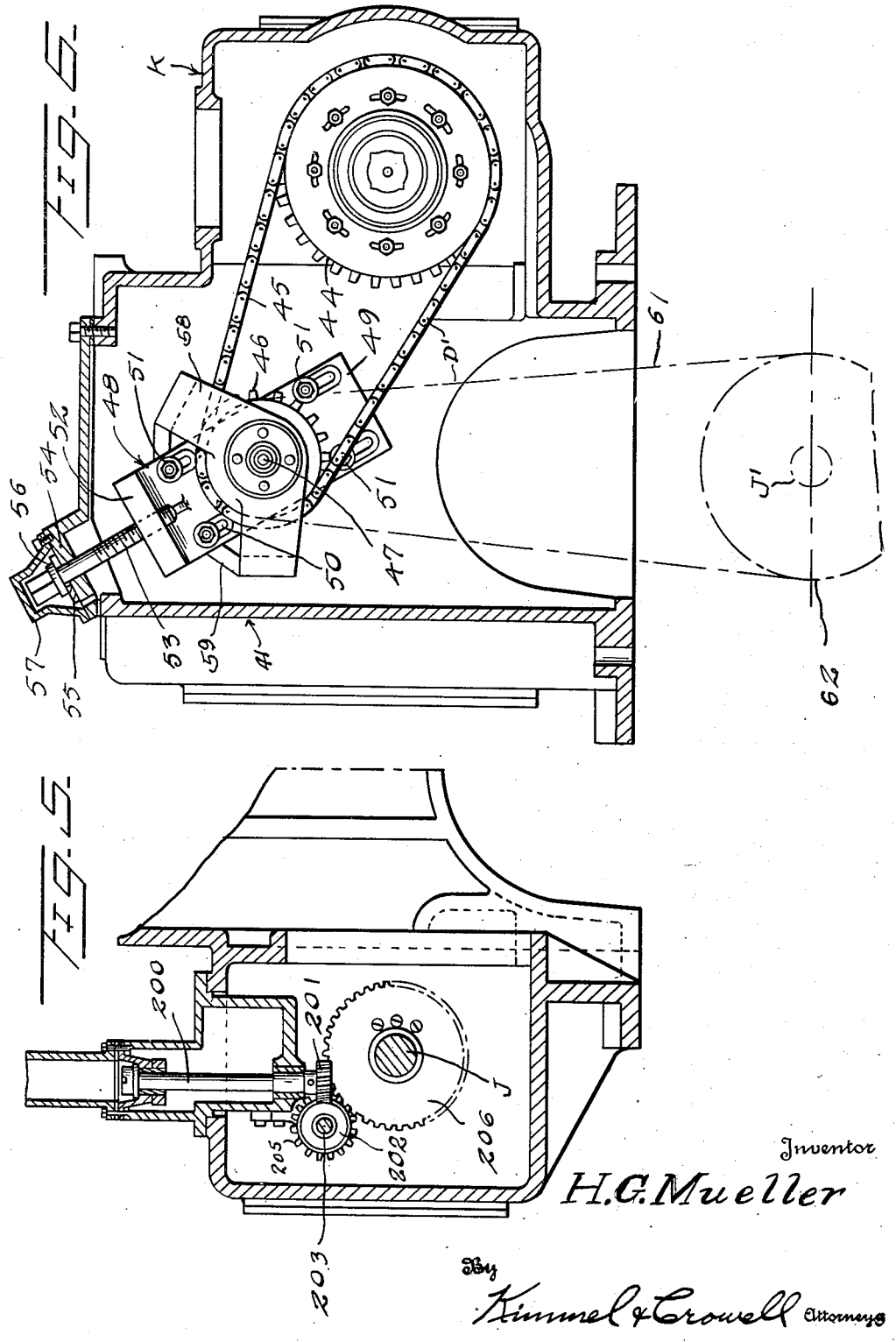

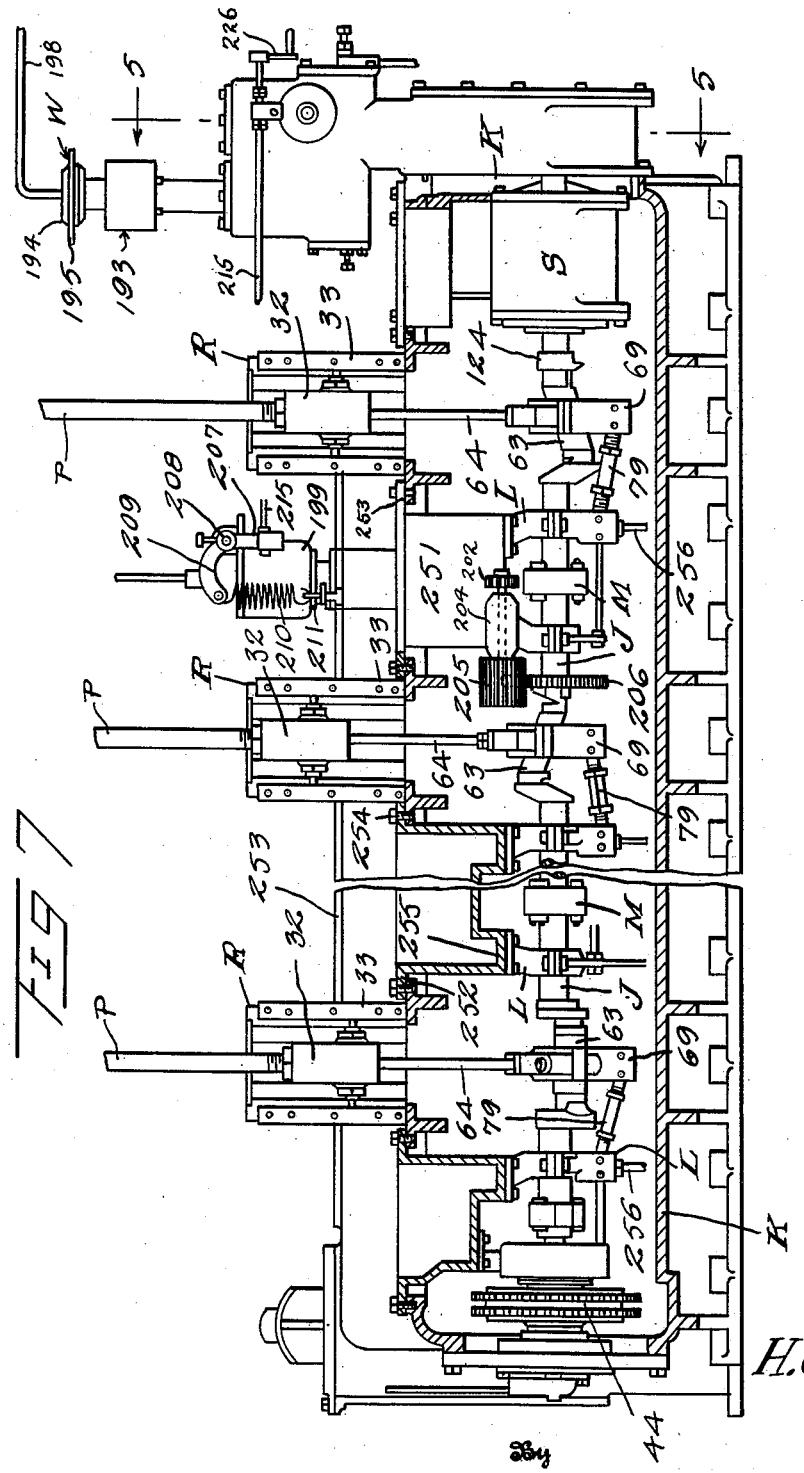

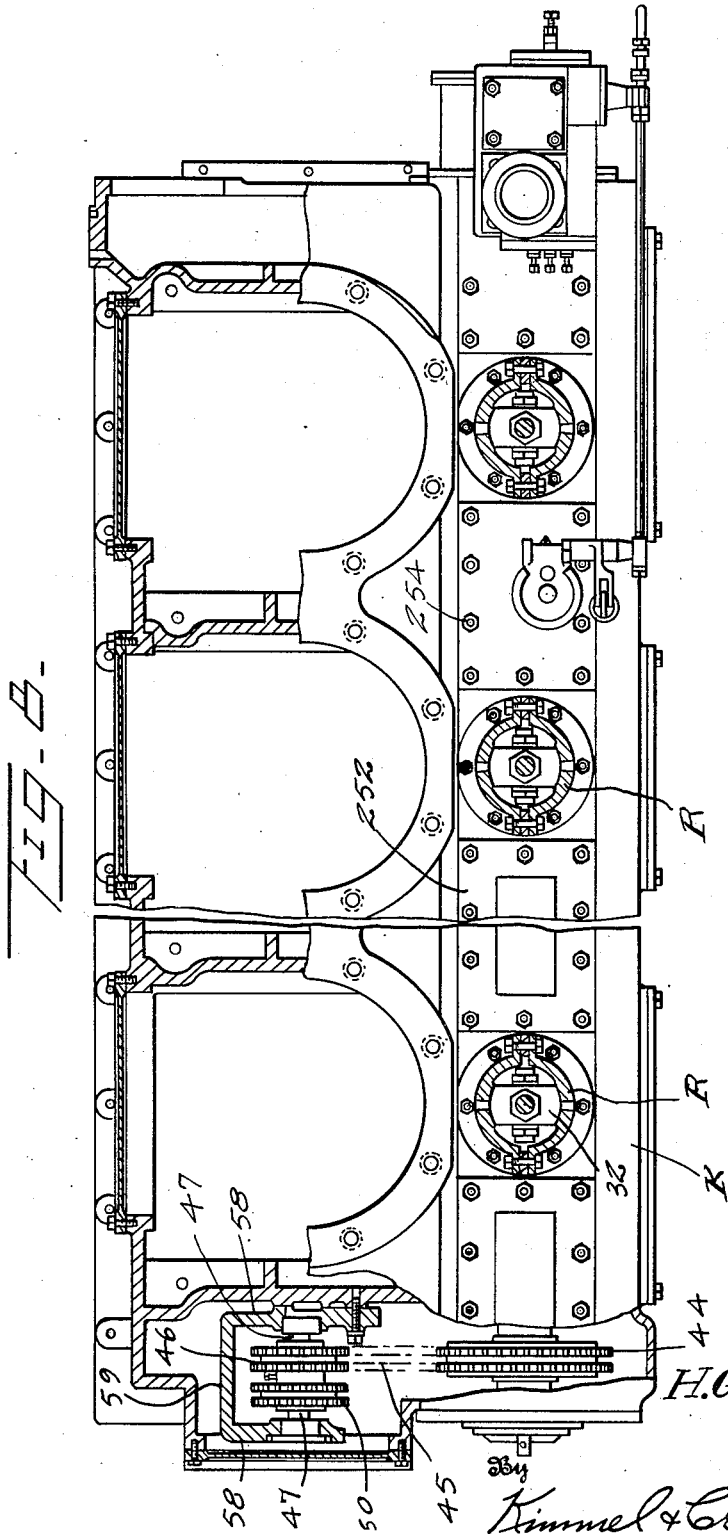

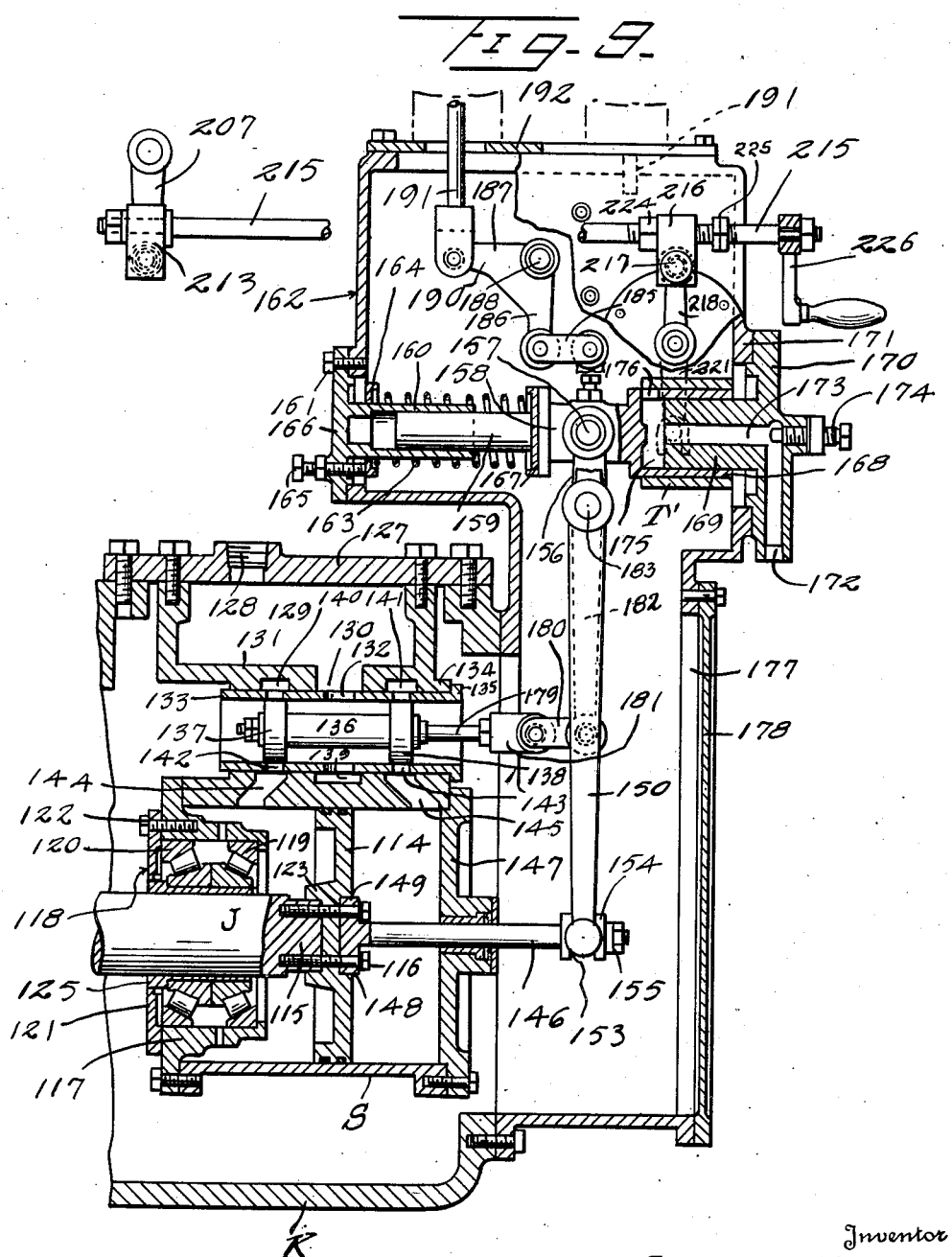

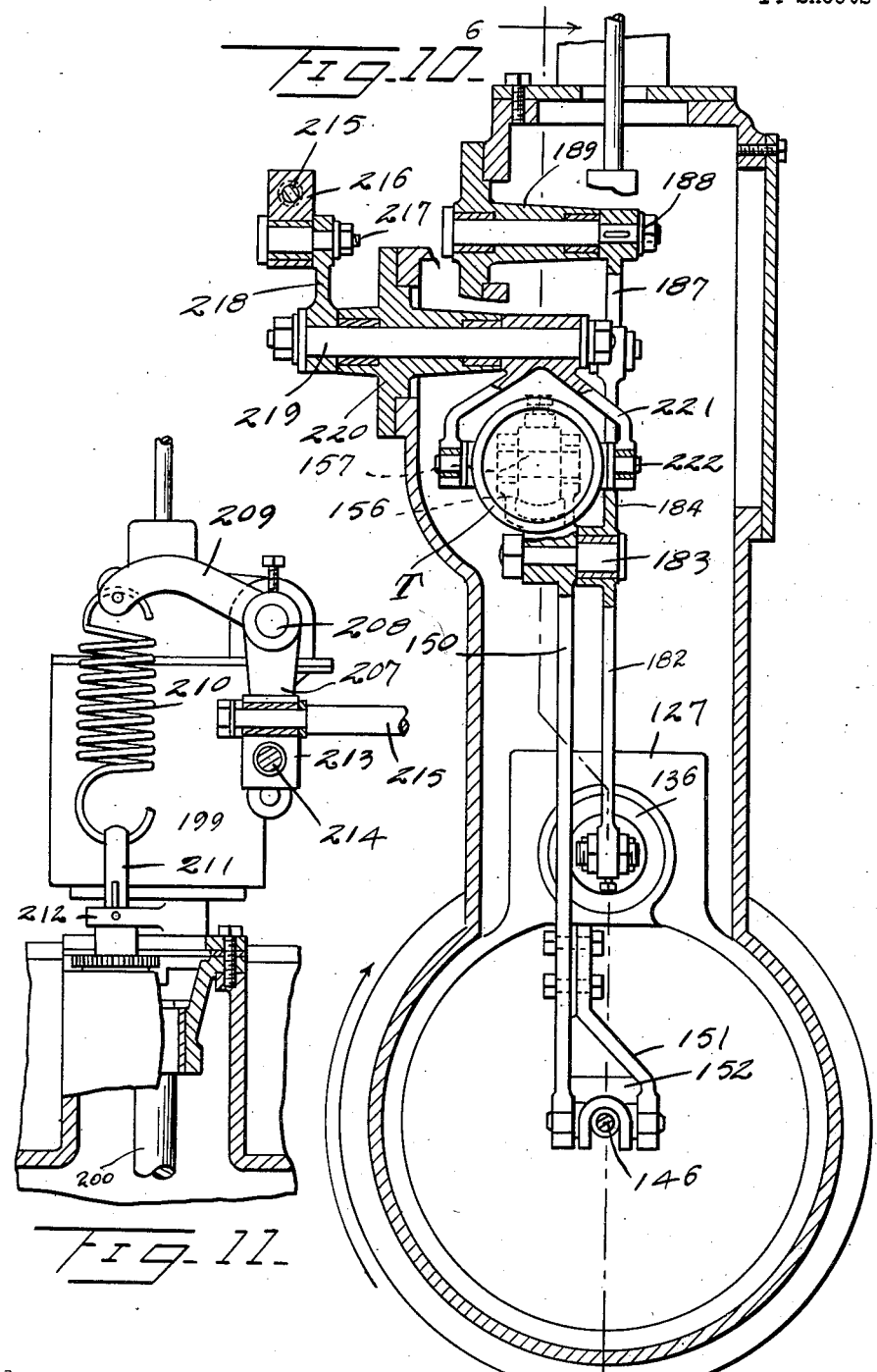

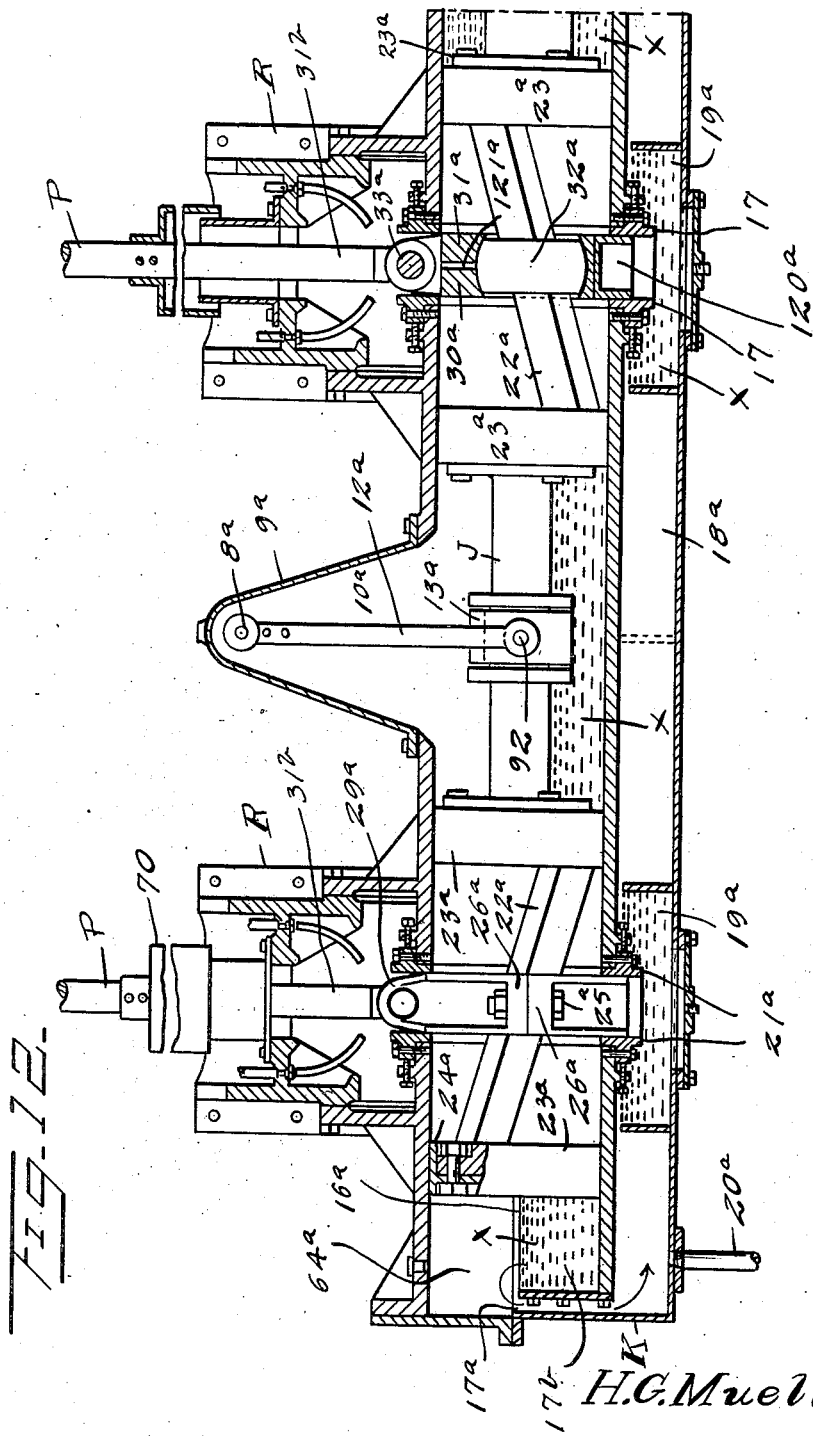

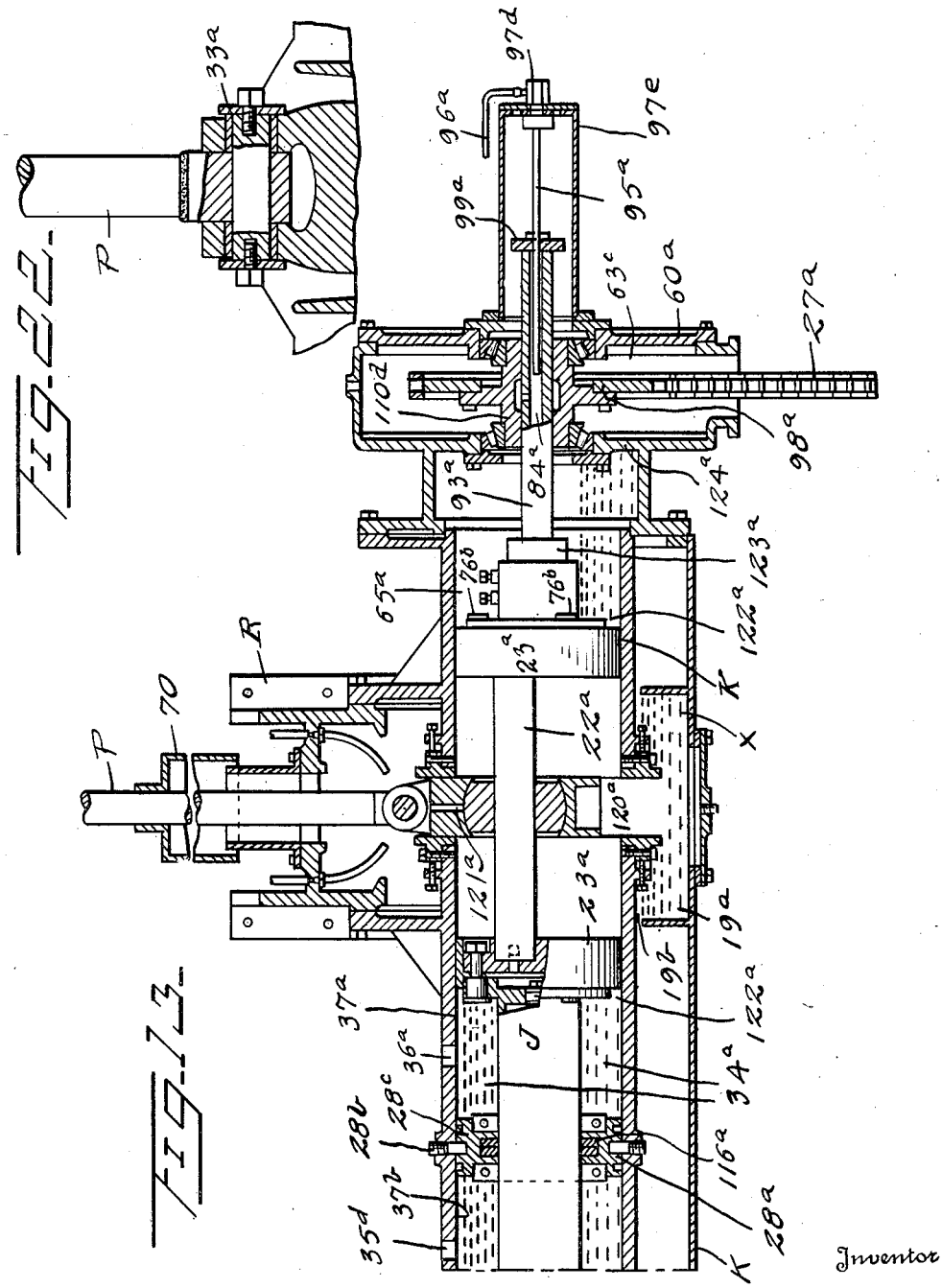

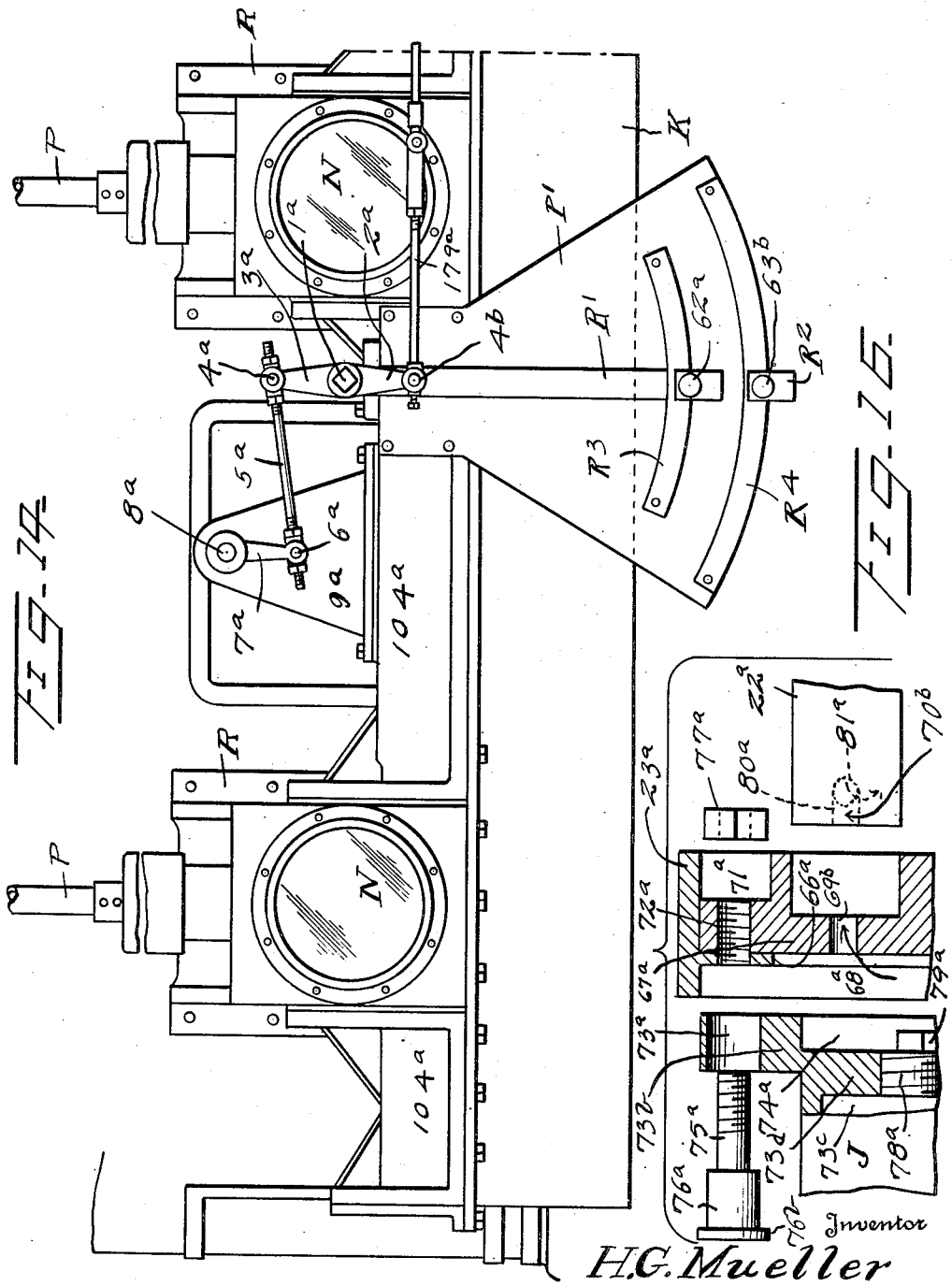

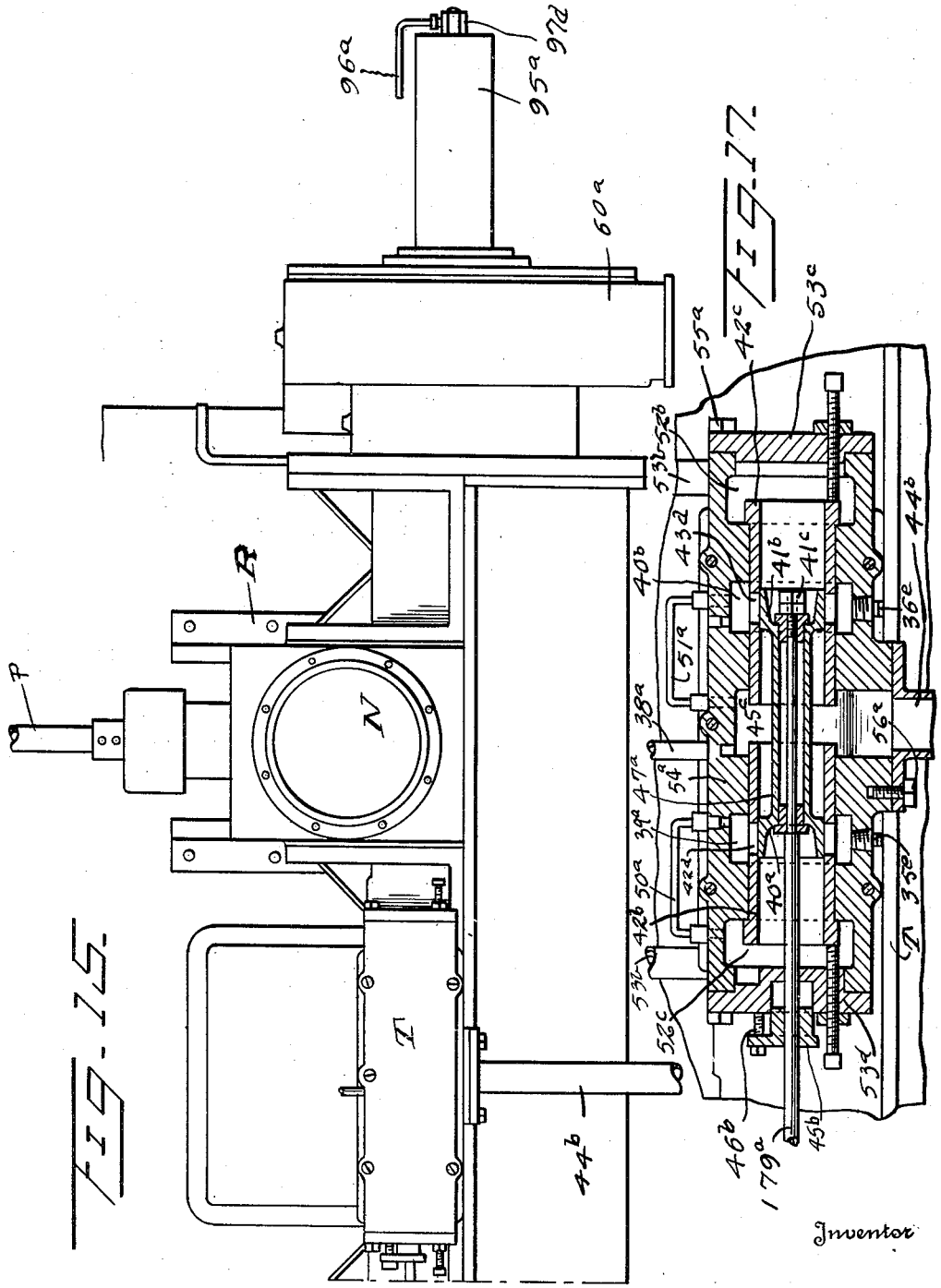

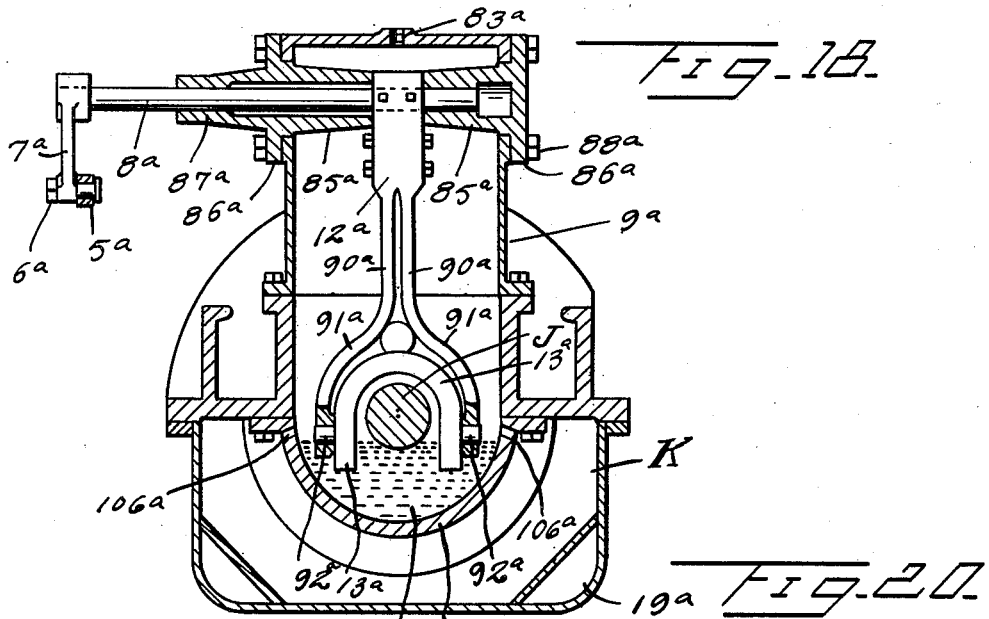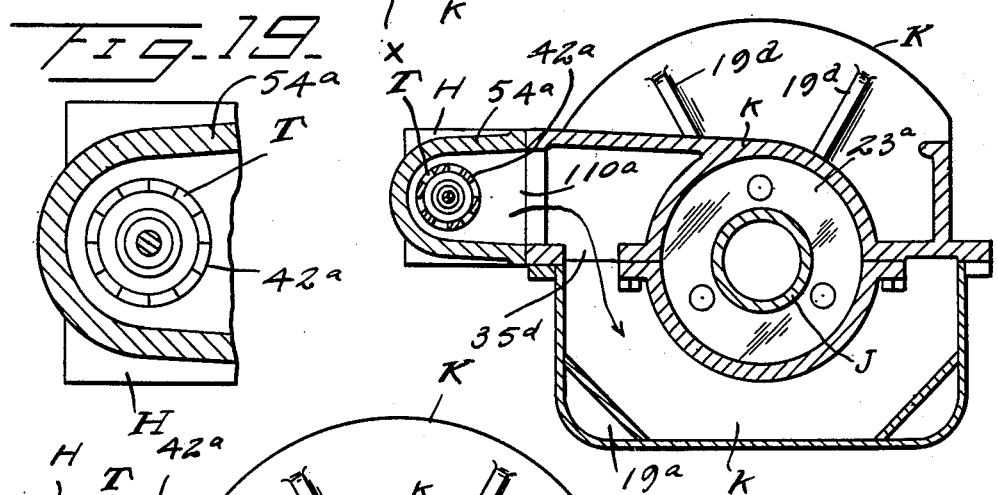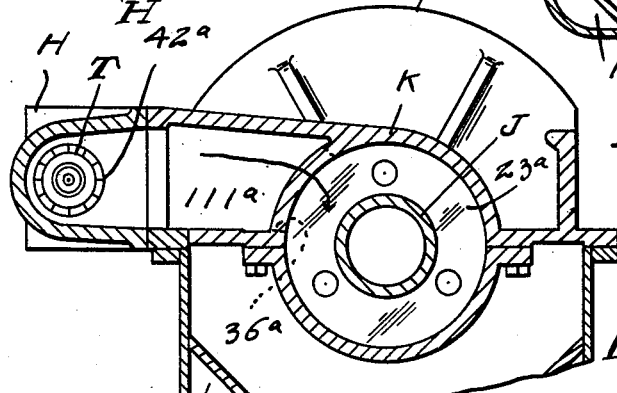

Patented July 4, 1950

2,514,287

UNITED STATES PATENT OFFICE 2,514,287

COMPOUND ENGINE CONVERSION UNIT

Herman G. Mueller, Erie, Pa., assignor to Ajax Iron Works, Corry, Pa., a corporation of Pennsylvania Application October 10, 1946, Serial No. 702,400

13 Claims. (Cl. 230—9)

The present invention relates to improvements in power generating apparatus and more particularly to engines, and is a continuation in part of my copending application Serial No. 490,071, filed June 8, 1943 for Valve Gear for Steam Engines, now abandoned.

The main object thereof is to provide a vertical steam cylinder driving end for mounting on a lower crank case carrying horizontal compressor cylinders. It aims to provide a compressor drive where the lower crank case is a part of the compressor outfit.

Hithertofore high powered Diesel engines have been used in connection with heavy duty compressors and the like. The present invention replaces the Diesel engine with a steam engine for driving a battery of compressors with the distinct advantage of lowering costs, increasing power, and eliminating cumbersome mechanism.

Another object thereof is to provide improved power generating means for driving compressors in which an automatic control is had for a multi-cylinder engine instead of a throttle control such as is in common use in connection with compressors.

A further object thereof is to provide manually operative means for controlling the instrumentalities made use of in the present engine, as auxiliary equipment for use in connection with the automatic control provided for maintaining constant pressure for suction or discharge purposes, constant flow of gas under pressure, constant speed of the power generating means, control of over speed, and in general control of all steam events.

A further object thereof is to convert a Diesel engine drive for compressors into a steam engine drive therefor characterized by the fact that a compound uniflow set of cylinders is employed for condensing service, where the exhaust is sub-atmospheric, and that special crank case expedients and valve gear expedients are used.

A still further object thereof is to provide, in a device of the kind described, an automatic control of the functions of the steam engine and compressor adjunct thereof, by making use of a constant pressure and volume control for varying the cut-off thereof on the steam cylinders and thus the power or speed of the whole machine, in order to balance the demand for gas, air, etc.

Another object thereof is to provide, in an engine of the type described an assembly of parts by which a compound uniflow engine may be readily assembled on each crank, working independently of and duplicating the others, which admits of building an engine out of any number of attachable units, from a minimum of two, to meet a wide range of speed and horse power conditions.

A further object thereof, is to provide, in a device of the kind described, a compound steam cycle to eliminate use of receivers, and to assure furnishing continuous expansion of steam from the throttle to the condenser. This makes possible an engine assembly in which an amply quick exhaust is supplied without the usually excessively large, but still inadequate exhaust valve, such as is now in common use on compound and triple expansion engines.

A further object thereof is to provide an engine of the kind described for use in driving compressors especially, wherein a single head carries steam at full initial pressure and temperature, thus giving thermodynamic economy advantages to the working ends of both the high pressure and lower pressure cylinders, and also giving some reheating effect to the steam which passes from the high pressure to the low pressure cylinder.

Another object thereof, is to provide, in an engine of the kind described, a uniflow cycle of operation, where the moisture is at a maximum, exhausting this directly to the condenser or a manifold common to all the low pressure cylinders. The piston valve which is used provides compression relief on the upstroke of the low pressure cylinder, thereby increasing the area of the indicator card and further improving the steam economy.

Another purpose thereof is to provide a steam engine drive for compressor and the like in which the upper side of the high pressure piston and the under side of the low pressure piston are vented to the condenser, thus breathing in and out of both cylinders, low temperature, low density, vacuum steam. This will reduce the cylinder wall temperature considerably below that resulting in any double acting engine so that it may require less wall lubrication.

Another purpose thereof is to provide a compound cycle for the purpose of greatly reducing the compression ratio, thus lowering the compression temperatures which are the chief source of excessive lubrication required on a single stage uniflow cycle.

A still further object thereof is to provide steady power for compressors and the like from a steam engine in which the compound cycle is employed for reducing the expansion ratios per cylinder on the power stroke, which, in the single stage uniflow, greatly emulsifies the excessive oil used and on account of this, entails the use of coagulating type filters for removing the finely divided oil particles from the condensate. The present engine, by reason of the new assembly of parts, assures that cylinder oil consumption will be reduced to a comparatively minute and negligible quantity, so that it can be absorbed by the conventional feed and filter box employing standard materials such as lufa sponges, cocoanut fibers or coke beds and in this way eliminate complications of coagulating fibers, and at the same time, give adequate protection to the boilers against cylinder oil.

A further object thereof is to provide an engine drive for compressors and the like gaseous-flow systems mechanism controlling all steam events in such a manner that no water cooling on any of the bearings is needed, since the oil passes through a cooler at each trip through the circulating system, screens being attached to the oil pump suction pipe.

A final object of the present invention is to provide valve mechanism controlling the steam events of the steam engine with due regard to the work to be performed by the compressors driven from the steam engine. By means of special instrumentalities provided herein the compressors are always on a cut-off control, which gives better steam economy than is possible by using a throttling over-speed governor.

With the above and other objects in view my invention consists in the combination, arrangement and details of construction disclosed in the drawings and specifications and then more particularly pointed out in the appended claims.

In the drawings, wherein similar reference characters designate similar parts throughout the respective views:

Figure 1 is a perspective view of the power plant constructed in accordance with my invention.

Figure 2 is a perspective view of an engine employing my invention not of the compound form.

Figure 3 is a vertical sectional elevation of the steam engine proper.

Figure 4 is a longitudinal sectional elevation of the steam control valve used to control admission and exhaust of steam in connection with both high pressure and low pressure cylinders.

Figure 5 is a fragmental, vertical sectional view of a worm drive controlling coordinative functioning of steam admission and exhaust events and compressor-actuated flow pressures.

Figure 6 is a fragmental sectional detail view in cross section of a chain drive casing.

Figure 7 is a longitudinal sectional view of the crank case part of my invention readily attachable to a steam engine, this view showing an automatic control of the flow pressures of the compressors.

Figure 8 is a top plan view of the crank case shown in Figure 7.

Figure 9 is a fragmental vertical sectional view of the oil actuated valves controlling flow pressures of air or oil in the present invention.

Figure 10 is a sectional elevation showing vertically the oil controlled valve mechanism of Figure 9.

Figure 11 is a fragmental enlarged detail view, in side elevation, of the centrifugal governor control of the flow pressures.

Figure 12 shows a one-half view of a longitudinally sectional illustration of flow-pressure control mechanism, effected hydraulically, where the control is not automatic but manual, the other half of this illustration appearing in Figure 13; here is shown the chain end part of the valve crank case.

Figure 14 shows a one-half view, in longitudinal elevation of the parts shown in Figures 12 and 13, the other half view being shown in Figure 15; here is illustrated the chain drive end of the valve gear crank case.

Figure 16 shows a collection of details of a piston assembly with a view of indicating their manner of being pieced together.

Figure 17 is a longitudinal sectional view of the valve mechanism manually controlled for moving the crank shaft fore and aft.

Figure 18 is a cross section of the lever mechanism for returning the crank shaft after it has been moved longitudinally.

Figure 19 is a fragmental sectional detail view of an oil flow control.

Figure 20 is a cross section of an oil transferring part of a pilot valve.

Figure 21 is a cross section of an oil returning part of a pilot valve.

Figure 22 is a fragmental view, in elevation, and partly in section, showing manner in which a valve rod is connected to an eccentric strap.

Referring to the drawings, which are merely illustrative of my invention the various parts thereof are made fully to appear. In the present invention there is coordination between a compound uniflow steam engine proper, regarded as a distinct unit, a main crank case assembly therefor, regarded also as a separate and distinct unit, a compressor outfit, which is also a distinct unit by itself, a hydraulic system of controlling gas flow pressure for the compressor outfit or any similar machine, which is also a separable adjunct by itself to the power plant to be hereinafter described herein. Besides these, another separate unit consists of the valve gear assembly which is designed to actuate the steam engine steam admitting and exhausting means, and be itself actuated by said hydraulic system of gas flow pressure control apparatus. It may be added that employment of the same identical hydraulic system to thoroughly lubricate all parts of the power plant is also a special feature of the present invention. It may be desirable to automatically control the functioning of the hydraulically actuated means for operating the steam admission and exhaust valve mechanism as well as operating the gas flow pressure control apparatus and the various steam events as well. This is provided for. But manual control of these same instrumentalities is necessary in many cases. This is also provided for herein.

Reference being first made to Figures 1, 2, 3, and 7 certain parts are designated here which broadly influence the coordination of the several instrumentalities referred to above. In these figures the engine feet A are shown to support the entire structure of the power plant assembly. B is the framework in general. Means being provided for inspecting the functioning of the movable parts of the steam engine at various elevations of the frame work, doors D are provided to give access to the parts involved, which have lighted windows N. The duplicate multicylinders of the steam engine proper are designated E. The single acting low pressure uniflow cylinder is indicated at G, and the single acting counterflow high pressure cylinder is indicated at I.

The means controlling by a valvular operation admission and exhaust of steam from the engine is designated H. A single piece crank shaft is designated J'. The crank housing or case encasing hydraulically the valve gear crank shaft is shown at K. Bronze babbeted main bearings are designated L. Shaft couplers are indicated at M. The main crank case appears at O. The working cylinder steam control valve rods are illustrated at P. A bored oil tight housing is shown at R. The hydraulic piston cylinder is designated S. The pilot valve is marked T. A single control lever is designated U for controlling the work of the pilot valve and for regulating the pilot valve in its function. The pressure regulator apparatus for an oil pump is designated W. Oil in the crank case or housing is designated X. The venting manifold which connects all the high pressure cylinders is designated Y. The relatively large exhaust line is designated Z.

The steam condenser is illustrated at A1. The steam manifold appears at B1, the exhaust conduits at C1, chain drive from main crank to the valve gear at D1, the exhaust steam check to a turning engine is designated E1, the water inlet of condenser is indicated at F1 and the water outlet at G1. The throttle control is shown at H1.

It should be noted that readily and effectively putting together all parts of the power plant is highly desirable, and this factor has been constantly present in the assembly of the various instrumentalities now to be described. Self aligning of parts is also desirable and is attained in a simple manner by the use of a certain type of cross head guides. Ease of mounting movable parts in bearings with a view of simplifying their removal and replacements is also desirable. This is especially to be noted in connection with the manner of suspending the valve gear crank shaft in its housing. Meeting all requirements for operating with safety and precision all parts responsible for providing the various steam events with a view to controlling speed, time intervals of operations, pressure and volume activities, etc. is one of the leading attainments made possible by use of the present invention. Improved coupling means for building up the length of the crank shaft in accordance with requirements in an engine structure, herein shown, is in accordance with the best practice in engine assemblies.

I will now describe the compound engine in relation to the particular valve gear mechanism provided therefor for the dual purpose of timing the interval of operation of the pistons in both the H. P. and L. P. pistons, as well as for the purpose of affording control for flow pressures of oil, air and other fluid sources of supply used in functioning the moving parts of the engine structure for supplying the various steam stages and events.

A compound engine 20 is constructed of a series of units E, each embodying a cylinder and a slide valve, and each unit has correlated therewith a valve gear constructed according to an embodiment of this invention, to be hereinafter described. The engine 20 has secured to one side thereof a crankcase or housing K which is disposed above the main crankcase O. The crankcase K has rotatable therein a crank member J which is rotatable in bearings L carried by the crankcase K. The crankshaft J has secured to one end thereof a sprocket wheel 44, and a chain 45 is trained about the sprocket wheel 44 and is also trained about an idler sprocket 46. As shown in Figure 6, the idler sprocket 46 is mounted on a shaft 47 which is journalled through an adjustable bearing structure, generally designated as 48. Sprocket wheel 44 may be circumferentially adjusted relative to crankshaft J by means of adjusting bolts which engage through elongated slots.

The bearing structure includes a base plate 49 which is formed with pairs of aligned elongated slots 50 through which bolts 51 engage for guiding the base plate 49 on an angle to the vertical, in order to provide for the desired tightening of the chain 45. The base plate 49 has formed integral therewith a right angular flange 52 at its upper end through which a bearing adjusting bolt 53 is threaded. The bolt 53 extends through a supporting plate 54 which is upwardly offset from the housing 41 at one end thereof, and a washer 55 is interposed between the head 56 of the bolt 53 and the outer side of the supporting member 54. A cap or housing 57 is adapted to encompass the head 56 of the bolt 53.

The bearing structure 48 includes, as shown in Figure 6, a pair of parallel arms 58 which are V-shaped in side elevation, and are connected together by means of a connecting bar 59. A sprocket 60 is also fixed on the shaft 47 and is adapted to have trained thereabout a driving chain 61 which is trained about a driving sprocket 62 mounted on the adjacent end of the main crankshaft J' in crankcase O. In the present instance, the sprockets 44, 46, and 60 are double sprockets with pairs of chains trained thereabout and the adjustment of the idler sprocket support 48 will provide for adjustment of the driving and driven chains 61 and 45 respectively.

The crankshaft J has formed therewith, or secured thereto (Fig. 7), an offset 63 which is disposed at an angle to the length of the crankshaft, one end of the offset 63 starting from the plane of the center of the crankshaft and offset laterally thereof, and the other end extending angularly outwardly for the desired distance in order to provide for the necessary reciprocal movement of a valve connecting rod 64.

The upper end of the connecting rod 64 is rockably connected to a vertically slidable crosshead 32 which is slidable in a vertical guide 33 carried by the housing R. The crosshead 32 also has secured thereto the lower end of a valve stem P which extends upwardly from the guide 33 through a gland 70 and is connected to the valve stem 28 (Fig. 3).

In order to provide for maintaining the connecting rod 64 against movement lengthwise of the crankshaft J, I have provided at its lower end a cam strap 69 connected to a pair of adjustable tie members, generally designated at 79 (Fig. 7).

There are two of these tie members 79 for each strap 69 and the provision of the tie members provides a means whereby the lower end of the connecting rod 64 may be very closely adjusted relative to the inclined offset 63 in order that the operation of the valve of one unit may be accurately adjusted to balance with the operation of the valve of one or more adjacent units.

The crankshaft J is formed with a plurality of detachable units which are adapted to be coupled together by a coupling structure, generally designated as M.

In other words, while the main crankshaft J' may be made with as many integral offsets as may be necessary for the operation of the desired number of units, the valve gear crankshaft J is preferably made as an assembly, there being as many offsets 63 as there are offsets for the main crankshaft J'.

In order to provide for endwise adjustment of the crankshaft J, I have provided a cylinder S which is disposed at one end of the crankcase K. The cylinder S has slidable therein a piston 114, which is mounted on a reduced stud 115 by means of fastening bolts 116. The stud 115 is formed at one end of the crankshaft member J and the crankshaft J is rotatable in a bearing structure, generally designated as 117. The bearing structure 117 includes a bearing housing 118 having disposed therein opposed roller bearing members 119 and 120. A plate 121 is secured by fastening members 122 to the outer end of the housing 118 and retains the bearing members 119 and 120 within the housing 118. The piston 114 is formed with a hub 123 which is adapted to abut against the inner bearing 119 when the piston 114 moves to the left. The movement of the piston 114 to the right is limited by means of a shoulder 124 (Fig. 7) carried by the crankshaft J and which is adapted to abut against a sleeve 125 disposed within the two bearings 119 and 120.

A pressure chest 127 (Fig. 9) is disposed above the cylinder S and is provided with an intake port 128 which is adapted to be connected to a source of fluid pressure and, in the present instance, is preferably connected to an oil pressure line, the oil under pressure being discharged into the chamber 129 within chest 127. The chest 127 is formed with an outlet port 130 in the lower wall 131 thereof, and the outlet port 130 communicates with a port 132 which is formed in a valve sleeve 133. The valve sleeve 133 is mounted in an intermediate housing 134 and is formed at its outer end with a flange 135 abutting against the outer end of the housing 134. A slidable valve block 136 is mounted within the sleeve 133 and is formed with a pair of pistons 137 and 138.

The intermediate housing 134 is formed with an annular chamber 139 communicating with the outlet port 130 and is also formed with a pair of annular chambers 140 and 141 which communicate with pairs of diametrically opposed ports 142 and 143, respectively, formed in the sleeve 133. The port 142 communicates with a port 144 which also communicates with the interior of the cylinder S, and the port 143 communicates with a port 145, the latter port communicating with the interior of the cylinder S on the side of the piston 114 opposite from the port 144.

A reduced diameter shaft 146 is slidable through the head 147 of the cylinder S and is formed at its inner end with a flange 148 which is seated in a recess 149 formed in the outer side of the piston 114. The fastening members 116 securing the piston 114 to the stud 115 also secure the flange 148 in the socket or recess 149. A rock lever 150 is formed at its lower end with a fork 151 (Fig. 10) having a U-shaped block 152 secured between the arms of the fork 151. The U-shaped block 152 engages in the groove 153 of a grooved member 154 which is secured by fastening means 155 to the outer member 154 which is secured by fastening means 155 to the outer end of the reduced shaft or extension 146. The upper end of the lever or link 150 is also formed with a fork 156 which is rockably mounted on a pair of trunnions 157 carried by a slide member 158.

The slide member 158 includes a shaft 159 which is slidable in a cylindrical bearing 160 which is secured by fastening members 161 to a housing, generally designated as 162. The housing 162 extends upwardly from the housing or crankcase K. The slide member 158 is constantly urged to the right by means of a spring 163 which is disposed about the guide 160 and bears at one end against a flanged collar 164 abutting against the tensioning bolts 165 which are threaded through a flanged head 166 formed integral with the outer end of the guide member 160. The inner end of the spring 163 also bears against a flanged collar 167 abutting against the adjacent end of the slide member 158. The opposite end of the slide member 158 has formed integral therewith a cylindrical valve member 168 which is slidable on a stationary piston or guide 169. The piston or guide 169 is carried by a head or plate 170 secured to the outer wall 171 of the housing 162. The head 170 is formed with a vertically disposed oil duct or passage 172 which communicates with a horizontal passage 173. The horizontal passage 173 opens into the inner end portion of the cylindrical sleeve or valve member 168.

A threaded duct restricting member 174 is threaded into the head 170 at the meeting point of the two ducts 172 and 173 so that the amount of liquid entering the chamber 175 inwardly from the inner end of the stationary piston 169 may be regulated at the desired degree. The sleeve member or valve 168 is formed with an exhaust port 176 which communicates with the interior of the housing 162, and the interior of the housing 162 communicates with an end housing 177 having a removable plate 178. The horizontal adjustment of the slide member 158 regulates the position of the pivot members 157 for the lever 150 and also controls the operation of the valve member 136.

The valve member 136 has a valve stem 179 extending therefrom and a link 180 is pivotally connected at one end by means of a connector 181 to the outer end of the stem 179. The opposite end of the link 180 is pivotally connected to a depending valve operating lever 182. The lever 182 is rockably mounted on a pivot member 183 carried by the lever 150 below the pivot 157. The lever 182 is formed with an extension 184 extending above the pivot 183 (Fig. 10) which is pivotally secured at its upper end to a link 185 (Fig. 9). The link 185 is secured to the depending arm 186 of a bell crank 187. The bell crank 187 is pivotally mounted on a pivot member 188 carried by a supporting boss 189. The bell crank 187 has the opposite leg or side 190 thereof connected to the lower end of a diaphragm operated rod 191. The rod 191 extends upwardly through the top wall 192 of housing 162 and extends into a spring pressed air pressure regulating device, generally designated as 193 (Fig. 7). The regulating device 193 includes a housing 194 having disposed therein a diaphragm 195. Air pressure is admitted to the upper side of the housing 194 above the diaphragm 195 through an air pressure pipe 198 which is connected to a source of air pressure supply, such as a compressor or the like which is independent of the compressor operated by the engine herein described and is termed the "Master Control."

The endwise position of the crankshaft J is also controlled by means of a centrifugal governor 199. The governor 199 is of conventional construction (Fig. 11 and Fig. 5), and includes a rotatable shaft 200 having secured to the lower end thereof a worm 201 which meshes with a worm gear 202 (Figs. 5 and 7) carried by a gear shaft 203 rotatable in a bearing 204. The shaft 203 has fixed thereon a spur gear 205 meshing with a spur gear 206 which is fixed to the crankshaft J. The gear 205 is elongated so that the gear 206 will be in a constant mesh with the gear 205 in any adjusted position of the crankshaft J.

The governor 199 includes a rockable regulating arm 207 mounted on a pivot 208 (Figs. 7 and 11). The arm 207 also has fixed relative thereto an angularly disposed arm 209 with which one end of a spring 210 is connected. The spring 210 has the opposite end thereof connected to a spring tensioning member 211 which is threaded through a lug 212 carried by the lower portion of the governor 199. A block 213 is pivotally mounted on a pivot member 214 carried by the arm 207 and one end of an elongated regulating rod 215 is mounted in the block 213 and is disposed at a right angle to the axis of the pivot member 214. The rod 215 is threaded through a block 216 (Fig. 9) which is pivotally mounted as at 217 on the upper end of a lever 218. The lever 218 is secured to the outer end of a rock shaft 219 (Fig. 10) which is rockably mounted in a bearing 220. The rock shaft 219 has keyed thereto a shifting fork 221. The arms of the fork 221 pivotally engage trunnions 222 which are carried by a cylindrical valve T'. The valve T slidably engages the outer side of the cylindrical valve 168 and during the normal running of the engine the sleeve valve T is adapted to close the exhaust port 176. The rod 215 has threaded thereon adjusting nuts 224 and 225 which engage on opposite sides of the block 216 and the terminal end of the rod 215 has secured thereto a hand crank 226. The hand crank 226 is provided so that the operation of the sleeve T may be manually regulated or operated without operation of the governor 199.

Referring now to Figure 7, the bearings L for the crank shaft J, are secured in pairs to bearing supporting members 251 which are removable with respect to the crankcase housing K. The bearing supporting members 251 are constructed in the form of upwardly opening boxes or housings which are provided at their upper ends with flanges 252 overlapping the upper side 253 of the housing K, and secured thereto by fastening bolts 254. In this manner the upper side 253 of the housing K may be planed off and the lower side of the flange 252 together with the lower side of the lower wall 255 of the housing 251 planed off to provide for the desired distance between the upper surface 253 and the lower surface of the lower wall 255. This will permit the proper alignment of the bearings L within the housing K without planing or milling the bearing surfaces inside the housing K.

In order to provide for the proper lubrication of the eccentric straps 69, each bearing member L has connected to the lower portion thereof, an oil pipe 256 which communicates with a passage formed in the bearing.

Referring now to Figure 3, the numeral 20 designates generally a compound steam engine structure having secured thereto a valve gear, in crankcase K, similar in every detail to that heretofore described. The engine 20 includes an upper high pressure cylinder I which is mounted above a low pressure cylinder G. A valve structure H is interposed between the two cylinders I and G and is of a construction shown in Figure 4 soon to be described.

The cylinder I has slidable therein a high pressure piston 279 to which is secured a piston rod 280. The piston rod 280 is slidable through a gland (not shown) and is connected at its lower end to a low pressure piston 282 which is slidable in a cylinder G. The upper cylinder I has secured thereto, a head 283, and a venting manifold V connects all the high pressure cylinders together. The large exhaust line Z leads out of the lower part of low pressure cylinder G and connects to a condenser A1. The steam manifold B1 connects one end of the valve structure H with a source of steam supply J2. Exhaust conduits C1 connect exhaust line Z with each of the low pressure cylinders G.

The piston rod 280 is extended downwardly through the piston 282, through a gland 15. The cylinder supporting structure 291 also constitutes a cross head guide supporting structure, the crosshead guide generally designated as 290 being depending carried by the intermediate support 291. The upper crank case structure 293 is disposed below the supporting member 291, and is adapted to be secured to a lower crankcase structure O.

In Figure 3 it is seen that the cross-head guide 290 consists of oppositely arranged members 10 and 11 of vertical disposition having inner vertical tracks on which is adapted to slide the crosshead 13 operatively, which is carried at the lower end of piston rod 280 connected to L. P. piston 282. The glands 15 adequately pack this rod. The upper portion 16 of the pitman 17 is pivotally connected to crosshead 14. The lower end of pitman 17 is conventionally mounted upon the main crankshaft J. So is another pitman 18 connected for each separate compressor cylinder, to crankshaft J' at its inner end. At its outer end the pitman 18 is oscillatingly connected to crosshead 19 which reciprocates in a crosshead guide 20a.

I will now describe the valve mechanism controlling the H. P. and L. P. pistons in operation during each cycle of the compound engine. This is shown in Figure 4 and the parts here shown are housed in the valve structure H shown in Figure 3.

Valve casing H, Figure 3, supplied for each set of cylinders composing the multi-cylinder engine has contained therein a special valve construction, consisting of a plurality of longitudinally aligned piston heads operated from valve stem 28. This valve stem 28 is operated by suitable linkage consisting of link 26 pivoted at 27 to this valve stem, arm 28a of a bell crank lever pivoted at 81, to a fixed bracket 80 on the engine framework. The other arm of the bell crank lever is designated 29 and is operatively and directly connected pivotally at 30 to the actuating connecting rod P which is swivelably connected to the slide or crosshead 32.

In the casing H the valve stem 28 slides longitudinally, induced by the actuation of the connecting rod P. A stuffing box 23 fits snugly into this casing H at the end shown to the right, and it has a concentric reduced portion containing packing means 24 for making a fluid tight sliding connection between valve stem and this stuffing box, the clamping gland 25 assisting for this purpose in the usual manner.

The valve spindle 35 is a continuation of valve stem 28 and it is formed terminally with a reduced portion 35a, forming an intervening shoulder 35b. The sleeve end 38 of a piston 39 is mounted encasingly upon this reduced spindle portion 35a, abutting shoulder 35b at one end. Piston 39 reciprocates snugly in the cylinder case H, its head being designated 40 and its interior 44a. The flange 41a of a bushing 43 engages the outer face of the head 40 of piston 39 being attached thereto by fasteners 42. The bushing projects into the hollow interior 44a of piston 39. In a spider 36a is slidably guided coaxially of this piston 39 a poppet valve stem 47a of a poppet valve 49. A spring 47b is coiled around the poppet stem and at one end bears fixedly against the outer face of part 40 of the piston. At its opposite end this spring bears against a disk 47c, which disk is held attached to poppet stem 47a by the lock nut 48a screwing onto this stem. This spring normally causes poppet valve to close the open end of bushing.

The piston 39 slides in one of the two cylinders 50a and 51a which are in longitudinal alignment in spaced confronting relation located operatively in case H. The poppet valve and accessories are wholly located in cylinder 50a. (In the position of parts shown in Figure 4.) Another piston 61a slides in cylinder 51a at its left end. Its hollow interior is indicated at 62. Piston 61a has a concentric forwardly projecting sleeve 65 which fits around valve spindle 35, being shouldered endwise against the shoulder 35b in contact with the adjacent sleeve 38 of piston 39.

A third piston 53a slides in the right end of the cylinder 51a, whose hollow interior is designated 55a. The outer end of piston sleeve 52a has a reduced portion 64a having a socketed fit into the adjacent end of piston 61a.

The three pistons so far described comprising the valve are locked together securely and removably upon the valve stem and its spindle continuation as follows: valve spindle length adjusting nuts 36 are screwed home upon valve stem 28 and bear against the inner end of the sleeve 52 of piston 53. At the end of the valve stem or spindle remote to this end are screw threaded valve spindle length adjusting nuts 37. Between these sets of nuts at opposing ends of the valve stem a clamping action is maintained so that sleeve 63a is socketed against sleeve 38 of respective pistons 61a and 39, while sleeve 52a of piston 53a is socketed against piston 61a. Hence these pistons all move together reciprocatingly.

A vital part of this valve mechanism and structure consists of the ported arrangement for connecting both the H. P. and L. P. cylinders into proper communication with each other to stage at the proper timed intervals the various steam events. Stuffing box 23 fits into the nipple end 31 of the case H, at one end of this apparatus, so it is closed at this end. At the other end of the case H, a fitting 70a extends into it and closes this end of the valve casing H, this part having a flange 71 engaging the other nipple 31b formed on this casing, suitable fasteners 72 attaching this fitting in place. The steam line connects at B1 with the interior of the casing through the fitting 71. This fitting also carries an adjusting screw threaded pin 31a. The stuffing box 31 also carries a pair of L. P. starting valve adjusting screw threaded pins 31a, the inner ends of which abut against the outer end of cylinder 51a.

The main passage 60a connects the H. P. cylinder I with the interior chamber 59a of the casing H into which cylinder 51a extends, and around which this chamber extends. This cylinder 51a is formed at opposing ends with arcuate ports 61b and 58a respectively which communicate with the interior chamber 59a of the casing H. 58a are the low pressure admission ports, and 61a are the high pressure admission ports respectively. Passage 57a connects chamber or interior 34 of the case H with the interior of the low pressure cylinder G. 66 is a by pass. The poppet valve 49 being the low pressure starting admission valve, low presure relief ports are supplied at 61 in fixed cylinder 50a which communicate with the condenser leading chamber 68 in casing H which extends around this cylinder 50a. The boiler pressure chamber 69a extends around the confronting ends of cylinders 50a and 51a. Chamber 42a in the casing H is in advance of the piston 39 and connects for communication this valve casing with the interior of the low pressure cylinder G. It will be noted that piston 39 is formed with a series of coaxial ports 90 which communicate with the interior of fixed cylinder 50a.

There has been described thus far a vertical uniflow compound steam engine for conjoint use with compressors, in which use is made of the special valve gear mechanism. It should be here noted that there is an automatic control of the fore and aft movement of the valve gear shaft by means of the centrifugal governor 199 and the pressure regulator apparatus W, in conection with both air and oil employed conjointly. The various angular thrust cranks for all the multicylinders will, of course, be properly set angularly relatively to one another so as to properly time the order of actuation of the pitmans P that control the valve mechanism to the H. P. and L. P. steam cylinders. This construction of vertical compound steam engine is highly advantageous over the usual Diesel engine drive for compressors. Substituting, as I am doing, this type of steam engine in place of the Diesel engine, for surmounting upon the main crankcase O of the present invention, contributes entirely new factors of steam economy, steam events controlling, inertia-overcoming expedients, and wear and tear minimization in the operation of such compressors. The crankcase construction and contained valve gear mechanism is an adjunct to this compound steam engine because more efficient control is had of the valvular control of the steam that supplies both the H. P. and L. P. steam cylinder units, as I originally showed in my former patent number 2,295,962, over which the present invention is an improvement. Besides improvements brought about in various special details of construction of the valve gear crank shaft, bearings therefor all of which is embodied in copending patent applications of mine, the present complete assembly of steam engine with compressors introduces a type of power plant not hithertofore provided with as efficient a cut-off control on both the H. P. and L. P. steam cylinders as if afforded by the hydraulically actuated cut-off control maintained in the regular lubricating system for the various moving parts of the engine.

Referring now again to Figures 1, 2, 3, 7, 8 and other figures of the drawing, in explaining the general design of the machine for use with compressors, it is necessary to advert generally to features present therein which are also disclosed in said copending applications for patents. The crankcase O proper consists of two castings, the base A and the frame B, bolted together to form a rigid deep box section assembly, accessible thru the large doors C on either side. Into the top of the frame are assembled the duplicate cylinder units E, each consisting of a guide piece R, a single acting low pressure uniflow cylinder G working on the down stroke, a cylinder head containing the piston valve structure H, and above this is a single acting counterflow high pressure cylinder, working on the up stroke. Thus a complete uniflow engine is assembled on each crank, working independently of and duplicating the others.

The compound cycle, thus provided for, in the steam engine drive to the compressors, reduces the expansion ratios per cylinder on the power stroke. The lubricating system plays an important part in the high efficiencies maintained at all times in the moving parts of the engine. The crankcase contains a single piece shaft J' riding in main bearings to which oil is supplied under pressure from a positive displacement pump. The crank shaft is drilled from the main bearings to the crank box bearings which are of similar construction. From thence the oil passes to the crosshead bearings and the guide slippers, thus giving full pressure lubrication on all bearing surfaces within the crankcase. The result is small wear, requiring bearing take-ups only after long intervals of service, and, at the same time, giving high mechanical efficiency.

Both sides of the main frame are provided with large oil tight doors D, with large diameter port light windows N for easy accessibility. The interior of the crankcase together with valve gear housings, are illuminated with oil proof lights, so that the interior is always visible.

The enclosed forcefeed oil bath lubricated valve gear consists of a bored, oil tight housing K alongside the main guides 290. This housing contains a valve eccentric crank for each cylinder unit shown at 69, the angular spacing from one crank to the next being the same as the spacing of the main cranks. Each valve eccentric crank is fitted with a bearing and eccentric strap, 69 connected to the vertical eccentric rod P which actuates the single horizontal piston already described. It will be noted that the rotating valve eccentric cranks 63 in the housing K, are all coupled together to form a single assembly, which is driven by an adjustable heavy roller chain from the main crank shaft J'. This is the chain 61 shown in Figure 6. The hydraulic piston in housing S shifts the complete assembly forward for ahead rotation, and moves it aft for astern rotation. The oil for this movement is taken from the main oiling system through a pilot valve.

With the use of single acting H. P. and L. P. pistons, all steam events, admission to the H. P. cylinder, exhausting direct to the L. P. cylinder and compression relief on the L. P. cylinder are all provided by a single piston valve in housing H. This valve has been shown to be single ported for H. P. admission at 54a, double ported for exhausting from H. P. to L. P., as at 61a and 58a, and single ported at 67 on the compression relief. This valve is mounted in chrome plated hardened valve bushings or cylinders 50a and 51a, and carries simple cast iron snap rings, requiring a minimum of lubrication on the hardened surfaces. The outer end of this valve structure is fitted with a poppet check valve 49, engaging an adjustable pin 32, for the purpose of automatically admitting throttle steam directly to the L. P. cylinder for starting purposes, only when the piston valve is in extreme long cut-off travel. In this manner each complete engine unit is controlled by a single piston valve, easily adjusted and of steam tight construction and negligible wear and tear.

The general idea is back of the hydraulic cut-off control, which is actuated from the main lubrication system of the engine is to enable a complete rotating valve eccentric assembly to be had which is capable of shifting fore and aft for varying the cut-off on both the H. P. and L. P. cylinders. It is actuated by the hydraulic piston cylinder S, which is itself controlled by means of the pilot valve 136—137—138 by a single control lever 150 which is fitted with a return motion linkage 182. From this arrangement, it will be seen that each position of the control lever gives a corresponding position of the valve gear. When the lever 150 is in a vertical position the valve gear is in neutral and admits no steam to the engine, even though the throttle is wide open. The cut-off can be varied from zero to maximum for starting and the engine can be entirely controlled, ahead or astern, stopped and started with the throttle open, simply by adjusting the cut-off in either direction. The lead is thus maintained constant.

The oil for actuating the gear is supplied from the oiling system and is maintained at a constant pressure to give perfect cut-off control on the oil pump. From Figures 7, 8 and 9, it will be seen that the guide frames R are inserted into the top of the frame, engaging the frame at mid-length of the guide, where the guide thrust is maximum. These guides have a cylindrically bored surface with full bearing area on both sides, one taking the pressure for ahead rotation and the other for astern rotation. The guide piece is concentrically doweled to the L. P. cylinder, thereby maintaining perfect alignment regardless of expansion changes in the engine, each cylinder unit being entirely independent of the next one.

The fore and aft sides of each guide piece, above the frame, are fitted with removable doors D, so that all cross head parts may be readily accessible. They are also accessible through the large doors on either side of the crankcase.

In order to operate the individual cylinder units and all units collectively action of the single acting steam valve will now be explained. Reference will be had to Figure 4. Each piston valve for each unit consists of the three spools or pistons 39, 61a, and 53a, all on the same spindle or stem, arranged thereon concentrically, held against endwise displacement by the double locknuts 36 at one end and 37 at the other end of the stem 28. This valve assembly rides in the two bushings or cylinders 50a and 51a, pressed into the cylinder head H.

In operation, when the valve moves to the right, steam is admitted to the H. P. piston 61a, by way of ports 61b, as soon as the piston clears these ports, the steam coming in through the steam inlet B1. With the valve in the mid-position shown in Figure 4, the steam admission lap is $1\frac{3}{32}$ of an inch. When the valve moves to the left, then the exhaust from the H. P. piston is double ported by way of ports 61a and 58a and passes out of the end of the cylinder 51a through the large passage 57a that empties into the low pressure cylinder G. The exhaust lap on both of these ports with the valve in mid-position is $1\frac{1}{2}$ of an inch.

The leftmost piston 39 of the main piston valve serves the purpose of balancing the pressure on the other two pistons and, in addition, seals the ports 67 which connect to the chamber 68 so as to be piped to the condenser on the outside of each cylinder. The lap on these ports is $1\frac{1}{16}$ of an inch, with the valve in mid-position, and these ports serve to relieve the compression on the upstroke of the L. P. piston, primarily for easy starting of the engine.

It is noted that the piston 39 also contains the spring loaded poppet valve or starting valve 49, which, when opened, admits steam directly from the cylinder head to the low pressure cylinder by way of the large passage 42a. To operate this valve, the set screw 32 has been provided in the valve bonnet or fitting 70a, which is adjustable so as to move the stem of the poppet valve one quarter of an inch only when the main piston valve is at the extreme travel of 5½ inches.

The starting valve will then automatically open one quarter of an inch when the main piston valve is in full 5½ inch travel ahead or astern, admitting throttle steam directly to the L. P. cylinder. This full travel should only be used when starting the engine in either direction with the steam pressure materially reduced through the throttle. This starting valve, however, has not been devised for continuous operation against full throttle pressure.

Operation of the piston rod 280, actuates the cross head 14 which makes a traverse along its guide piece 290, and in this way the two pitmans 17 and 18 are also actuated, the latter operating the crosshead 19 connected to the compressor unit. Definite pressures are being built up either predeterminately or otherwise, automatically, in the fluid pressure lines supplied from the compressors. For this reason the speed of the engine must or should be controlled automatically and selectively as well. Under pressures and over pressures as well as failures to maintain a desired set pressure must or should be taken care of as well. It is for this reason that the operation of the single piston valve is made dependent directly upon the actuation of the valve rods P by means of the longitudinally movable action of the valve gear crank shaft J with respect to the eccentrics operated thereby. By moving longitudinally it is proposed that the valve gear crank shaft also control and be influenced by hydraulic means which is delicately responsive to changes in fluid pressures and volume. For maximum economy of the engine the throttle should always be wide open, and the control transferred to the cut-off, which will then give full steam pressure in the cylinders. The throttle should be closed when reversing the engine and should be used for throttling the steam when starting and warming up the engine.

For the purpose of turning the main steam engine over into any position, initially desired for working on the engine internally, setting the valves, or kindred object, a turning engine and gear is supplied, mounted at M1 in the general framework shown in Figure 1. Exhaust steam has a line N1 running to this housing. The main engine bearings will be flushed with oil when turning over with the small engine, and it is also essential to have the valve gear in long cut-off in the direction in which the engine is being turned and at least a partial vacuum in the condenser in order that compression on the main engine cylinders will be relieved.

In Figure 1 at H1 is shown the handle of the dual throttle control and cut-off levers, R1—R2, which have varied position traverses upon a quadrant board P11 upon which at its upper end it is pivotally mounted.

By suitable linkage this control lever is connected to the piston rod 179 (Figure 9) of the pilot valve 136—137—138, which controls directly cut-off operations. The arrangement is such that the exact relations between the steam throttle valve and markings on the quadrant board is provided for. Lock nut adjustments of the throttle lever R2 are made so that the control levers travel approximately equally above and below horizontal position in order to reduce angularities to a minimum. Manual control of the cut-off pilot valve is thus given. The quadrant has two control levers, one an upper and one a lower. The cut-off control lever R1 is the upper one on the control quadrant and when this is in vertical position and in the center hole marking on the quadrant, the valve gear is in neutral position and the engine should stop regardless of whether the throttle is open or closed. In this position the pilot valve T should be closed and in the position shown in Figure 9.

In Figures 12 and 14 appear, more in detail, the parts here adverted to. It is seen that the two control levers—cut-off lever R1 and throttle lever R2 are both fitted at their upper ends by means of a square pin 1a to the center of an equalizing lever consisting of arms 2a, 3a, so rocking of either control lever or both together also rocks this equalizing lever has pivotally attached thereto the link arm 179 for operating the pilot piston valve. The other arm 3a of this equalizing lever is pivotally connected at 4a to a link arm 5a which, at its free end, is pivotally attached at 6a operatively to the lower end of a rock lever 7a fixedly pivoted upon a housing 9a on the main framework. Inside of the housing 10a is seen a depending swivel lever 12a also fixedly mounted at its upper end upon pivot pin 8a. The lower end of this lever 12a is pivotally secured upon a coupling 13a fixedly mounted upon the valve gear crankshaft J (Fig. 12).

It is clear that throttle control lever R2, cut-off control lever R1, and lever 12a swing together at the same time. Lever 12a is called the return motion lever for valve gear crankshaft J.

The equalizing lever 2a—3a should be in exactly vertical position when the valve gear is in neutral and so should be the rock lever 7a which is mounted on the same fixed pivot pin 8a therewith. The last named lever picks up the motion of the valve assembly. It is also seen that the valve gear must be in mid travel or neutral in order that the return lever 12a will be vertical. When, thus, the pilot valve is closed in neutral position it will seal the ports 142, 143 (Figure 9) with a one-sixteenth inch lap on either side of the port. The cut-offs on the high pressure cylinders are indicated by holes on the quadrant.

The crankshaft J is drilled to supply oil to the various crank boxes and connecting rods, cross head boxes, etc. The valve gear housings fill to the center line 16a (Figure 12) with the oil X, at which level overflow holes or passages 17a drain back to the oil pan 18a. The pilot valve T, by way of passages 176 (Figure 9), also drains to the oil pan. The pan is baffled to form oil baths under each valve crank eccentric (Figure 12).

The valve gear lubricating and hydraulic oil system, emanating from the same oil tank source, is drained when the oil is removed from the main engine. However, pockets of oil are purposely trapped under the valve eccentrics to insure a sufficient supply of oil to the eccentrics at all times.

The foregoing statement of automatic control of the cut-off finds ready application to compressor drive back pressure engines of which the present invention is an example. The vertical multicylinder uniflow steam engines, complete with upper crank cases and valve gear and controls have been shown to be designated for mounting on the lower crank cases of the complete power plant. Where high pressure and high temperature steam conditions have to be applied or maintained and where either high or low back pressures are needed for using the exhaust steam for other auxiliaries, process heat and building heat, the present invention will perform satisfactorily. The cheapest and lowest grades of fuels can be used ordinarily to generate steam and often waste products in industry are used for fuel at very low costs. The exhaust steam is available for building heat, industrial process heat, hot water heat, boiler feed heat and numerous other purposes. It is often found that the power from a steam engine is a by-product of a necessary heating load. By passing this steam through the engine, which removes a minute portion of the heat in the steam, converting this at nearly perfect efficiency to power, practically all of the original heat in the steam is still available for other purposes. Under such conditions a steam engine produces the very cheapest form of power generation, and it is for this reason that the steam engine, in the present invention, replaces the Diesel engine power plant for operating horizontally driven compressors.

Cutting off the present steam engine for variable speed drives is a simple process, as is regulating its speed to maintain constant compressor or pump discharge pressures or volume flows. This assures high starting torques and quick acceleration and smooth silent running conditions of the power plant. This speed controlling of the compressor is automatically regulated simply by changing the cut-off on the steam power cylinders without throttling the steam pressure, thus maintaining full steam economy over a wide range of horsepower and speed conditions.

Such regulation is desirable in order to maintain a constant compressor discharge or constant suction pressure or constant volume flow or a constant speed, as the case may be. These controls are very flexible in functioning efficacy because of the fact that they are automatically operated with oil-pressure either from the main oiling system or a separate oil pump.

In synthetic rubber plants, oil refineries, chemical and ordnance plants need is felt for the cut-off steam engine controls such as has been explained herein. Compressed gas is largely made use of, according to demand requirements, which is always balanced by increasing or decreasing steam cut-offs, thereby increasing or decreasing, respectively, the speed and supply of compressed gas automatically and independently of any other controls which may remain inactive under normal operating conditions. Should the oil supply taken from the oil tank 15a fail, it is desirable to automatically shut down the machine. How the present invention operates to perform the various hydraulically controlled operations will now be detailed.

Normally the oil pump pressures will be regulated predeterminately so that the oil pumps will hold between 60 and 80 pounds pressure on the gauge over the pilot valve when the latter is closed. When the pilot valve is open, to move the valve gear hydraulically and longitudinally of the crank housing K, the oil pressure will momentarily drop to between 20 and 30 pounds until the pilot valve has again been returned to the closed position, and then the pressure will recover to the original setting and the pump will slow down to a speed which will just take care of the leakage in the line. At 80 pounds pressure on the gauge the valve gear should move from full forward to full reverse, or vice versa, in approximately two and one-half seconds, with the engine standing still. At normal full load and speed and with throttle wide open and full pressure of 200 to 220 pounds at the throttle, the cut-off setting on the quadrant should be from 50% to 55% in either direction.

Thus start up the oil pump and establish the oil supply through the main pilot valve T and the oil failure control cylinder S. Then to apply manually on top of the diaphragm of the compressed gas control gas element sufficient gas pressure, about twenty pounds, to depress the diaphragm and spring, and move the valve control piston automatically by oil pressure to the right a sufficient amount for long starting cut-off.

The throttle is then opened slightly, after opening all the cylinder traps and steam line, and the machine is turned over slowly, possibly 50 R. P. M., for circulating the steam through the cylinders for warming up and also draining all water. At this low speed, the over-speed centrifugal governor 199 will be wide open, or against the stop, the spring tension on the adjusting screw being far greater than the centrifugal force. This position of the centrifugal governor, that is with the arm 209 in its lowermost position (Figure 7), is the normal operating position of that governor, which at all speeds below 350 R. P. M. merely acts as a positioning lever for the hand control rod 215 and the sleeve valve T. The oil pressure supplied from the oil pump through passage 172 will move slide 158 slightly to the left, against the pressure of spring 163, until the leakage of oil through port 176 reduces the oil pressure sufficiently to balance the spring tension. The amount of this leakage is governed by adjusting screw 174, choking the oil in passage 173. This adjustment then fixes the position of slide 158 and pivot 157 for normal operating conditions on the pressure control diaphragm regulator 193, as long as sleeve T is held in a fixed position by the spring loaded over-speed governor 199, and with a more or less constant oil pressure in chamber 175.

The normal functioning of the machine on cut-off control from the diaphragm regulator W is as follows:

Assume that the speed of the machine is balanced against the demand of the gas being compressed, the machine will then run at constant speed on a constant cut-off, and the spring of the regulator just balancing the gas pressure on diaphragm 195. When the demand for compressed gas decreases, the fluid pressure on diaphragm 195 will drop slightly causing the diaphragm to raise slightly. Since pivot 157 is held stationary, lever 182 will move valve 136 slightly to the right, establishing communication between chamber 129 and cylinder S on the right side of piston 114, and opening the left side of cylinder 113 through port 142 and the open left end of sleeve 133, to cylinder S.

The oil pressure on the right side of piston 114 will cause valve gear crankshaft J to move to the left or to a reduced cut-off position.

This will also cause lever 150 to move to the left, carrying pivot 183 with it, which will swing lever 182 to the left until valve 136 again closes ports 143 and 142, hydraulically locking piston 114 from further movement and fixing the cut-off momentarily at a reduced value. If this cut-off is still too great to balance the reduced compressor gas demand, the diaphragm will be further depressed and the operation repeated until the cut-off reaches a value which will balance the compressed gas demand.

Conversely, if the compressed gas demand increases the pressure on diaphragm 195 will increase, lowering rod 191 and moving valve 136 to the left, establishing communication between chamber 129 and the left side of piston 114 and relieving oil pressure on the right side through port 143 and the right open end of bushing 133. This will move the valve gear crank shaft J to the right, increasing the cut-off and speeding up the machine and will move lever 150 to the right and move valve 136 to the right, again closing ports 142 and 143 and again hydraulically locking piston 114.

Assume, now, that a temporary demand on the machine exceeds the capacity of the machine and the compressor coupled thereto causing the pressure on the top of the diaphragm to be automatically increased in order to bring the valve gear into maximum cut-off position, this will cause the speed of the engine to increase up to 350 R. P. M., which is the maximum speed of this particular machine. The spring tension on the over-speed governor is adjusted so that at this maximum speed the centrifugal force of the fly balls overcomes the spring tension, raising the lever 209 to thereby move the sleeve valve T' to the right, opening port 176 and permitting the oil pressure in the cylinder 168 to be reduced, the oil flowing out of port 176.

At this instant spring 163 will move slide 158 to the right and valve 136 will move to the right, thereby establishing communication between chamber 129 and cylinder S on the right side of piston 114. Fluid pressure on the right side of piston 114 will cause valve gear crankshaft J to move to the left, or to reducing the engine speed means compressing less gas in the compressors at a given time. The reduced cut-off position of crankshaft J will reduce the engine speed and again return the valve 136, closing the ports 142 and 143 in similar manner to that described above.

During this operation the diaphragm remains constantly in extreme lowermost position, since the demand is more than the capacity of the machine at its maximum speed. It remains in this position because the demand will not be satisfied and thus holds rod 191 down and link 185 to the right in a fixed position, and lever 181 is then actuated by movement of slide 158 with pivots 157 and 183. The operation of valve 136 and piston 114 is then repeated as described above under pressure regulation, but in this case is controlled by the centrifugal governor moving sleeve T' to the right or the left as the speed increases or decreases, respectively.

The tension of spring 163 and the oil pressure in chamber 175 will cause slide 158 to follow the sleeve by opening or closing port 176. Thus, the speed is controlled at the maximum of 350 R. P. M. for which the spring 210 is adjusted whenever the demand exceeds the maximum supply. This also furnished a constant speed control below the maximum speed, if desired, by adjusting the tension on spring 210 to the speed desired and holding the diaphragm 195 in a fixed position, either extreme downward position with full gas pressure on the diaphragm, or extreme upward position with the gas shut off. In either position the cut-off control will operate as described above from the centrifugal governor at a constant speed for which the tension on spring 210 is adjusted.

If it is desired to manually control the speed by manual cut-off, below the speed for which the tension on spring 210 is set (and in which case arm 209 will remain in a fixed position) and with the diaphragm 195 in a fixed position, either extreme upward or downward, this is accomplished by the hand wheel 226 moving block 216 to the right or left, which will move sleeve T' to the left or the right, respectively, positioning the valve crankshaft J in a corresponding position and giving the machine a fixed cut-off set by the hand wheel. If, with such a manually set fixed cut-off, the demand increases, the pressure will fall, and the machine will speed up until the centrifugal governor again comes into operation at the maximum speed for which it is set.

In case the oil supply, which may be taken from the main oiling system of the machine, fails, then the pressure in chamber 175 will drop to a minimum and permit spring 163 to move slide 158 to the right, forcing the oil in chamber 175 back through the supply passage 172. Thus, the pivot 157 will move to the right until cylinder 168 stops against plate 170, reducing the cut-off to the minimum and shutting down the machine. This will function independently of sleeve T' or the position of stem 191 and will shut down the machine regardless of either the speed governor or of the pressure regulator or the hand control lever.

Where the engine is of the type shown in Figure 15, which is a compound engine of the uniflow type, the valve gear will operate in the manner hereinbefore described to provide for the proper reciprocation of the valve connected to the valve stem 274. The upper side of the cylinder 271 is in communication with condenser generated vacuum so that little or no resistance will act on the movement of piston 279.

In the several types of crosshead guides hereinbefore described, the guide can be readily formed in a boring machine which construction provides for the self-alignment of the superposed parts and by forming the crosshead guides with a stationary guide part, and a removable guide part, the crosshead may be easily inserted or removed and other repairs can be made to the parts associated with the crosshead including the piston rod and pistons.

The improved manner of forming the housing for the valve gear crankshaft eliminates any milling operations in the housing as it provides for the suspension of the crankshaft in the latter housing. As the shaft suspending elements are of a construction that they may be machined by a planing machine, it is possible to provide for the accurate alignment of the several bearings supporting the crankshaft.

In addition, by providing a hydraulic operator for moving the valve gear crankshaft endwise, it is possible to provide various types of regulators or controls for effecting the desired engine operation which were not heretofore possible with other types of valve gear structures.

The improved coupling means for coupling the crankshaft units also provides a compact coupling structure which is so constructed that the offsets or adjacent crankshafts may be circumferentially adjusted to coincide with the offset on the correlated main crankshaft, the coupling having a predetermined number of gear teeth which will permit the circumferential adjustment of the shaft units for predetermined degrees. In the present instance, there are preferably twenty-four teeth on the coupling members, adjustment of one unit relative to the other being in a range of fifteen degrees for each tooth. This coupling range may, if desired, be varied depending on the number of teeth in the confronting gears of the coupling elements. The other parts of the power plant should be right, too, before causing a functioning of the various control means.

In Figures 12, 13, 14, 15, 16, 17, 18, 19, 20, and 21 are disclosed a modification of the valve gear mechanism in relation to the single acting valve controlling admission of steam in both the H. P. and L. P. cylinders of the vertical engine. It is not sought herein to connect for coordinative purposes the fluid pressure or fluid flow controls with the valve gear including the crank shaft J. What is sought to be accomplished is manual control and operation of this fore and aft movement of the crank shaft J, which in turn operates the single valve mechanism contained in the housing H. The parts assembled in these figures involve improvements over details set forth in my former Patent No. 2,295,962, dated September 15, 1942. The present invention as compared with the construction of parts in my former patent, is not primarily designed for a reversing engine. It is largely in the matter of adapting a force feed oiling system for use in connection with the valve gear mechanism hereinafter described that my former patent has been improved upon, which also has the important effect of making the valve gear more accessible and reduces the overall dimensions thereof.

In Figures 12 and 13 is a longitudinal section of the assembly now to be described, in which the force feed of oil through the moving parts of the valve gear is made fully to appear. The construction of the fore and aft moving crankshaft J follows closely along lines disclosed in my former patent adverted to above. More minute details are herein supplied to show the manner of manually controlling the hydraulic operation of the crankshaft J and accessories, to indicate the two-fold purpose of the hydraulic system not only to actuate the valve gear but also to lubricate effectively all the movable parts thereof. This is one of the vital features of the present compound engine assembly for the compressors.

The whole valve motion assembly is assembled inside of the crankcase K and hung upon bearing holders which are inserted from the top of the crankcase, thus eliminating any internal machining inside of the crankcase.

The entire encasing unit for the mechanism is designated K and includes both the crankcase proper and the oil tank with the oil baths. The Z-shaped diagonal shafts 22a are joined at opposite ends to the cylindrical cast steel hubs 23a which serve as pistons in the case, being actuated by the oil X therein. Centrally of the diagonal shafts 22a is the eccentric bearing for the inner end or eccentric rod of the crosshead, which receives the direct thrust from the roller 32a and operatively connected to the rods P which actuate the single acting steam port controlling valve in the housing H.

The manner of assembling the cylindrical steel hubs or pistons 23a for attaching the adjacent ends of the crankshaft J thereto is fully illustrated in Figure 16. The shafts 22a are eccentric crank pins. Each piston 23a is a two-piece unit consisting of the cylindrical body 23a and a cylindrical body 67a contained therein and abutting the internal flange 66a formed upon body 23a, being attached to the latter by clamping means soon described. Body 23a has an enlarged end chamber of cylindrical formation designated 68a which at opposite dead centers of body 23a opens out so as to take in the oil present in the crankcase, by which the oil is conducted into the central interior of the hub through port 69a formed in body 67a, which port communicates with a cylindrical chamber 70b in said body, into which is fitted the adjacent end of the eccentric crank pin 22a. This end of the mentioned eccentric crank pin 22a has a duct 80a opening out endwise thereof into chamber duct 69b with which it registers, which duct also opens out peripherally of this pin as at 81a.

The shaft J is adapted to have each end, where same is to be attached to the pistons 23a, shaped as will now be described. In Figure 16 it is seen that it comprises forming a flange 73b upon this end of the crankshaft J into which is drilled a hole 73a. If the relation between crankshaft J and the hub 23a is to be a detachable one, in that event the end of the crankshaft J may be separately secured by approved means. But as shown at this end of the crankshaft, the latter is made hollow as at 73c, a pipe plug 78a screwing into the adjacent closure part 73d of the crankshaft J, having the polygonal head 79a. When the crankshaft J is pushed as far back into body 67a as it will go, it is seen that its flange 73b will snugly extend into cylindrical chamber 68a of hub 23a, as will the head 79a of the pipe plug 78a. The parts having been assembled with the end of the eccentric pin 22a operatively secured against endwise displacement from socket 71a of the hub 23a, the screw threaded bolt 75a is passed through hole 73a of flange 73b, so as to extend into and be screwed home in the bore 72a drilled into the body 67a, after which the nut 77a will be screwed home upon the protruding end of the bolt 75a. As this bolt is thus secured, its boss 76a of enlarged diameter is snugly and slidably received into thru hole 73a so that its head 76b will abut body 67a. With the parts thus assembled, and with two hubs 23a confining each eccentric pin 22a in position to the main line of the crankshaft J in the crankcase K, it is seen that a line of flow of lubricating oil in the crankcase K is assured, oil being free to pass into peripheral port 81a of the pin 22a, as well as into chamber 68a of the hub and makes its way into pipe plug 78a and gets into the hollow interior 73c of the crankshaft, passes over to the opposite end of the crankshaft and takes a similar course through the hub located there and flow out of the port 81a of the next adjacent crankshaft section J.

Fixedly mounted in the crank housing K, as shown particularly in Figure 13 is a partition in the nature of the oil cylinder packing plate 28c, which is held against endwise movement in this housing by means of the pipe plugs 28b projecting through the shell of the housing into this plate 28c. The latter encases a pair of packing washers or disks 116a that fit upon the peripheral surface of the slidable crankshaft J. On either side of this plate 28c, at the proper points, are provided oil passages 35d and 36a.

In Figures 20, 21, it is seen how these passages 35d and 36a communicate with the hydraulic oil system for operating the fore and aft movement of the crank shafting J. The pistons 23a are shown in the cylindrical crankcase K. The pilot valve is shown at T.

It is understood that oil under hydraulic pressure introduced on either side of the fixed plate 28c is employed to induce movement on the adjacent piston or hub 23a in the right direction, but as this takes place on the other side of this plate oil must be displaced back into the main hydraulic line of flow of oil.

In Figure 21 is seen how oil directed by the pilot valve and following the course indicated by the arrow, flows into passage 11a, port 36a into the crank cylinder K for moving the proper piston 23a. Figure 20 shows, in connection with the opposite port 35d, how the oil to be displaced and exhausted back to the main hydraulic line of flow of oil is directed by the pilot valve T into passage 110a, and thence through port 36d for this purpose into the crankcase K.

The elongated crankcase K is provided in the vicinity of the pilot valve T with a housing shown in Figures 12 and 18 in which the return motion lever 12a operates. Figure 14 will also be referred to now.

The lever 12a is a bifurcated member shown in Figure 18. Its upper part is pivotally mounted upon a pivot rod 8a which is journalled in two bushings 85a, each having a flange 86a secured by fasteners 88a to the housing 9a. It is preferred to divide the lever 12a into closely contiguous shanks 90a which provide the oppositely arranged curved arms 91a of the fork, in which arms are the trunnions 92a that are attached to the sleeve or horse-shoe shaped member 13a which operatively shifts the crankshaft J.

Also fixedly mounted upon rod 8a is a link 7a (also shown in Figure 14) on which is a wrist pin 6a that centers a connecting rod 5a or link that at its opposite end is similarly coupled upon a pivot pin 4a passing through one arm 3a of an equalizing lever, the other arm of which is designated 2a, this equalizing lever being mounted on a square pin 1a fixedly mounted in position by approved means. The other end of the equalizing lever, on arm 2a is coupled pivotally at 4b to the push and pull rod 179a that operates the pilot valve shown in Figure 17.

Also attached to the square centering pin 1a that, when it is turned, rocks the equalizing lever are the two control levers, R1 which is the steam cut-off lever, and the aligning control lever R2 which is the throttle control lever for turning on the steam. At their lower ends they carry the operating handles 62a and 63b respectively. These two control levers have a limited range of movement across the quadrant P1 (Figure 14) determined by the ends of the guide segments R3 and R4.

The pilot valve is shown in Figure 17. It is arranged in the housing T. which is formed at the ends of the pilot valve proper with the oil lubrication passages 53b and at another point with a lubrication oil supply passage 44b.

54a designates the shell of the pilot valve. It is bored out centrally and longitudinally to receive the longitudinally spaced apart cylinders 42b and 42c in which work the slidable pistons 40a and 41b, having a tubular connecting stem 41a. The main connecting rod 179a passes into cylinder 42b, piston 40a, hollow interior of stem 47a, and piston 41b, suitable adjusting lock nuts 41c assisting in clamping this rod to the piston 41b. The shell 54a is bored out centrally to provide an annular chamber 45a with which communicate the cylinders 42b and 42c. It is bored out again at the end of cylinder 42b to provide an annular chamber 52c which communicates with pipe 53b. The shell is further bored out at the end of cylinder 42c to provide here the annular chamber 52b with which the adjacent end of this cylinder 42c communicates. The shell 54a is additionally bored out between the ends of cylinder 42b to provide an annular chamber 39a which communicates with oppositely disposed ports 42d formed in the cylinder 42b. The shell finally is bored out between the ends of cylinder 42c to provide here an annular chamber 40b which communicates with the opposing ports 43d formed in cylinder 42c.

Adjustable stop pins 45a are tapped into the end closure plates 53c, which are attached to the ends of the shell 64a by fasteners 55a. They engage the adjacent ends of cylinders 42b, 42c. A pass oil pipe, 51a, connects the central chamber 45c of shell 54a with the annular chamber 40b, and a similar bypass pipe 50a similarly connects annular chambers 52c and 39a. A stuffing box or bonnet 45b is carried by end plate 53d and attached by fasteners 46b to this end plate. At 35e and 36e are shown the passages controlling inflow and return flow respectively of hydraulically pumped oil from the pilot valve to crank case K and vice versa.

It will be seen that (Figures 12 and 13) between partition plate 28c and the adjacent piston or hub 23a on either side thereof are the oil chambers 37a and 37b which are virtually completely filled at all times with oil as at 34a. At the left end of the crank housing K, oil X is trapped in a chamber 17b made by the end wall of the housing and the adjacent endmost piston 23a of crankshaft J. There is an overflow passage 17a from this chamber into the oil pan 18a at the bottom of the housing K. Similarly at the other end of the housing K (Fig. 13) another chamber of oil is formed at 65a made by the endmost piston 23a and the closure plate 124a which is secured to the sprocket chamber 63c of the housing 60a. At the bottom of each eccentric strap, whereby means of flanges 26a and fasteners 25a the eccentric diagonal pins 22a confine the eccentric rollers 32a, is an oil trap 19a which communicates with the outflow port 21a of such eccentric strap. At 20a (Fig. 12) is a drip pipe depending from oil pan 18a.

An oil distributing box 123a (Fig. 13) forms an extension from the endmost piston 23a at the right of the crankshafting J, which is a continuation of a hollow shaft 93a disposed concentrically of the crank shafting J, and which extends through the hub 110d of the sprocket wheel 98a to which the transmission sprocket chain 27a is attached that is operated from the main crankshaft of the engine.

The hollow shaft 93a is closed as at 99a at its outermost end. Its interior bore is designated 84a into which extends an oil pressure pipe 95a that has its other end received into an injection device 97d. A pipe 96a leads from the injection device 97d and a cylinder 97e surrounds and conceals the end of the hollow shaft 93a and is connected to the housing 60a. It will also be seen that each eccentric strap has a duct 121a which brings oil to the roller 32a of these eccentric bearings.

In operation, while the hydraulic pumps are working carrying a line of flow under pressure of oil into the pilot valve, oil is also being injected by way of supply pipe 96a, injection device 97d by way of force feed pipe 95ª into the bore 84a of the hollow shaft 93a. Then oil, under constant pressure, finds its way into box 123a, thence into the next adjacent piston 23a from the crankshaft section J. The oil leaves piston 23a by way of chamber 68a of the body 67a thereof, socket 70a, port 80a and outlet 81a. The oil entering chambers 68a of the pistons, which dip into the oil at 122a, finds entrance into pipe plug 78a into the hollow crankshaft J. Oil under pressure also enters the outlet 120a of the eccentric strap bearings and by it is distributed by ducts 121a to the straps. The drippings from this eccentric bearing find their way back to the oil traps or oil bath 19a, from which there is an overflow back into the main oil pan 18a. In this way by a force feed all parts of the crank shafting J are thoroughly lubricated, being given full pressure lubrication on all bearing surfaces within the crank case.

Each vertical eccentric rod P actuates a single horizontal piston valve shown in Figure 4 and already described, when the crank shafting J is moved fore and aft in its housing.

By compounding the cylinders of the present steam engine, the range of steam pressure drop and steam temperature drop per cylinder is much less than it is in a similar uniflow engine, thus materially reducing the degree of oil emulsification which is troublesome in removing before it passes to the oil feed system and the boilers which generate the steam for the engine. The valve gear mechanism begins to function when the cut-off control and throttle levers R1 and R2 are operated. They operate any number of cylinders in line and with any crank relationship. The crank assembly is moved longitudinally in one direction for ahead rotation and in a counter direction for an astern rotation. Accurate cut-off is obtained down to zero and a so-called "shoestring" or friction card can be obtained with 1 per cent or 2 per cent cut-off and full steam pressure on the engine. The lead port opening is constant for all cut-offs and can be varied by changing the lap on the single acting steam valve.

In Figure 17, referring to action of the pilot valve, it is seen that the two pistons 40a, 41b close the ports 42d and 43d and prevent oil passing thereto from the feeding oil line 44b leading to a pump (not shown) operated independently of the engine. The two interconnected pistons 40a and 41b also prevent oil from draining from chambers 39a, 40b, on opposite sides of the partition plate 28a through the passages 35e and 36e to the drain connections 53b which lead back to the main engine crank case from whence the oil may drain back to the pump (not shown).

The pistons 40a and 41b are moved longitudinally in cylinders 42b and 42c by the connecting rod 179a. The levers R1 and R2 can be moved either to the right or left. Assume that they are to be moved to the right. This causes equalizing lever 2a—3a to move in such a direction that arm 3a moves to the left, turning the link 7a in the same direction, which also turns lever 12a in the same direction which will move the pistons 40a and 41b to the left, thereby opening oil passage 36e and allowing oil to pass from the supply line 44b to the crank case housing K and opening the oil passage 35e to the drain line 53b. The greater pressure of oil exerts a pressure upon piston 23a, and therefore moves the crank shafting J to the left.

When the operator manually shifts the levers R1 and R2 in a counter direction, the reverse of the operations just described takes place and pistons 40a and 41b move in a counter direction, so now the movement of the crank shafting J is reversed. This has varied the cut-off manually on both the H. P. and L. P. steam cylinders, by use of the single steam valve and single pilot valve described herein. Each position of the control levers gives a corresponding position of the valve gear. When the levers are in vertical position the gear is neutral and admits no steam to the engine since throttle lever R2 is coordinated and synchronized in movement with control lever for the cut-off process R1. This is true even if the throttle is wide open. The cut-off may be varied from zero to maximum for starting and the engine can thus be controlled entirely by hand ahead or astern, stopped and started with the throttle open, by adjusting the cut-off control lever in either direction on the quadrant. The lead is maintained constant.

The oil for actuating the gear is supplied from the oiling system and is maintained at a constant pressure by a pressure regulator on the oil pump. The operator need only move the small pilot valve and the oiling system does the work. The oil pilot valve governs the amount of oil in both ends of the cylinder, which is made possible by provision of the packing plate 28c. When oil is fed to the forward chamber of the cylinder or housing the entire valve gear assembly moves forward, exhausting oil from the rear end of the housing. When the valve gear assembly is in its extreme forward position the valve stroke is 5 and ½ inches, and causes the engine to run forward, with maximum cut-off. When the valve gear assembly is in extreme rear position the valve stroke is also 5 and ½ inches, and causes the engine to run in reverse, with maximum cut-off. Intervening positions give cut-offs approximately proportioned to the displacement from neutral position in either direction and normal cut-off is obtained with approximately four and three-fourths valve stroke. The oil pan at the bottom of the crank case or housing is drained to the oil tank, and oil is sprayed on all valve gear parts by injection through the nozzle 95a and other parts. The oil pan carries cross ribs which trap the oil under each eccentric crank, forming a bath into which the strap dips on each stroke. The bored bearings fill with oil in the center line for which overflows are provided as shown in the drawings.

The pilot valve is closed when the valve gear is in neutral. The valve gear must be in mid-travel in order for the return motion lever 12a to be in vertical position.

What I desire to claim is:

1. A power plant comprising a vertical array of superimposed steam cylinders, certain being high pressure and others low pressure cylinders connected to the high pressure cylinders, a main crank case having a crank shaft operated from said cylinders, a steam supply means, connections from said steam supply means to said cylinders, a turning engine located below said cylinders receiving a steam supply from said steam supply means, an auxiliary crank case above the main crank case having a crank shaft operated from the main crank shaft, means controlled by said auxiliary crank shaft for timing the steam events in said cylinders, an oil tank at the lowermost part of the power plant, and oil feed connections from said oil tank extending to said cylinders, said crank shafts, and said turning engine.

2. In a power plant as described, the combination of a vertical battery of respectively high and low pressure cylinders, a valve housing interposed between the high and low pressure cylinders, a valve operating in said housing controlling the steam events in said cylinders, a horizontal compressor apparatus at the base of the power plant operated from the main crank shaft, an auxiliary valve housing adjacent to the low pressure cylinders, a crank shaft in said auxiliary housing, means controlled by the last-named crank shaft for actuating the first named valve, means whereby the main crank shaft operates the other crank shaft, an oil tank at the base of the power plant, a force feed oil line from said oil tank, means controlled by the force feed oil line for hydraulically rendering the last-named crank shaft active, means controlled by the force feed oil line for lubricating under pressure the moving parts in the valve housing, auxiliary valve housing and the cylinders, and means supplying steam to the high pressure cylinders.

3. In a power plant as described a vertical battery of superimposed high and low pressure cylinders interconnected for compound engine duty, a source of steam supply, an exhausting source for said cylinders, a condenser associated with said exhausting source, steam injection means tapped into the condenser for supplying a heating system, draw-off connections from the cylinders to said condenser, a main crank case at the lower part of the power plant, an auxiliary crank case located opposite to the low pressure cylinders, means controlling the auxiliary crank case from the main crank case in operation, means controlling the compressor equipment from the main crank cases, means injecting under oil pressure oil from said oil tank into the auxiliary crank case, a crank shaft in the auxiliary crank case hydraulically actuated by the injected oil therein to control the steam events in said cylinders, and means controlled by a force feed oil line from said oil tank for lubricating the cylinders, condenser, main crank case, and auxiliary crank case.

4. In a power plant, in combination with low pressure and superimposed high pressure cylinders of a compound steam engine, a valve housing interposed between the high pressure and low pressure cylinders, a single-acting piston structure in said housing, a stem attached to said piston structure for valve actuation thereof, a two ported steam chamber and a single ported steam chamber positioned at opposite ends of the housing, changing positions of the piston structure sliding in said housing controlling the opening and closing of the ports in said chambers, a poppet early-starting valve connected at one end of the piston structure, spring pressed means coacting upon said poppet valve, and means engaged by said poppet valve acting at the end of a stroke of the piston structure for actuating said poppet valve to control the admission of steam to one of said cylinders.

5. In a power plant, a vertical battery of steam cylinders of a compound steam engine, a horizontal battery of compressors at the base of the power plant operated through said cylinders, a pressure flow line from said compressor, an oil tank at the base of the power plant, an oil pressure line connected to said oil tank, a source of steam supply for said cylinders, a main crank case having a crank, an auxiliary crank case above the main crank case having a crank shaft therein, a valve case located in the zone of the steam cylinders, a steam pressure line from the source of steam supply, a condenser, hydraulic means in the auxiliary crank case actuating the crank shaft therein, means controlled from the oil pressure line for hydraulically rendering the last-named crank shaft active, means controlled from the oil pressure line for controlling pressures in the pressure flow line from the compressors, means controlled from the oil pressure line for lubricating the moving parts of the power plant, and means controlled by the steam pressure line for extracting heat from the steam cylinders for storage and distributing purposes.

6. In a power plant, as described, a vertical compound steam engine, a horizontal battery of compressors operated thereby and located at the base of the power plant, a pressure flow line from said compressors, a valve chamber associated with said steam engine for controlling the steam events thereof, a bell-crank operating the valve, a main crank controlled by the engine, an auxiliary crank shaft driven from the main crank, a housing enclosing auxiliary crank shaft, eccentric-controlled means on the auxiliary crank shaft controlling the operation of the bell-crank, means for hydraulically moving the auxiliary crank shaft longitudinally in said housing, to actuate said eccentric controlled means, a pilot valve hydraulically operated to control the movement of the auxiliary crank shaft, gearing on the auxiliary crank shaft, a speed governor controlled by said gearing, regulating the engine speed, means automatically responsive to both the governor and the pilot valve actions for controlling the pressure flow line from the compressors, and an oil pressure line synchronizingly coacting with the pilot valve and hydraulic means.

7. In a power plant, in combination, a battery of compressors, a compound steam engine driving said battery of compressors, a pressure flow line emanating from said compressors, a main crank shaft from which said compressors are controlled, valve mechanism controlling the cut-off of said steam engine, means operated from said main crank shaft for operating said valve mechanism, means for hydraulically timing the operation of said last-named means, means for predeterminately maintaining a constant speed of the steam engine, means for timing said last-named means from said valve mechanism, an oil pressure line associated with said hydraulic timing means operatively, means controlled by said oil pressure line controlling in turn excessive speed of the steam engine, and means whereby said pressure flow line from said compressors is made automatically responsive both to the hydraulic timing means and said oil pressure line for influencing pressure variations.

8. In a power plant, in combination with a compressor plant, steam engine propulsion of same, steam cut-off means for said engine, a main crank shaft operating said steam cut-off means, over-speed regulating means for said main crank shaft, a pressure flow line associated with said compressor plant, an oil pressure line, a pilot valve operated from said oil pressure line, propulsively, means actuated by said pilot valve for timing the operation of the steam cut-off means, means actuated by said pilot valve for timing the operation of the steam cut-off means, means actuated by said over-speed regulating means for operating said steam cut-off means, means responsive to pressure variations in said pressure flow line for controlling said pilot valve, and means responsive to variations in said oil pressure line for controlling said over-speed regulating means for operating said steam cut-off means, means responsive to pressure variations in said pressure flow line for controlling said over-speed regulating means.

9. In a compressor power plant, steam engine means of propulsion therefor, a pressure flow line leading from said compressor plant, an operator's quadrant, a housing upon which said quadrant is mounted, a valve gear in said housing, a main crank shaft of the steam engine, means controlled by said main crank shaft for rotating said valve gear, a throttle-control lever and a steam cut-off lever conjointly movable or separately movable over said quadrant, a pilot valve mounted upon said housing, said valve gear effecting steam cut-offs, a pilot valve stem for actuating said pilot valve, an equalizing lever operated by said control levers interchangeably, having one arm connected to said valve stem, a valve gear return lever operated by the other arm of the equalizing lever, hydraulic means controlled by said pilot valve controlling operation of said throttle control lever, and means responsive to variations in said pressure flow line controlling said pilot valve.

10. In a compressor power plant, in combination, steam propulsion means therefor having a main crank shaft, a housing containing valve gear mechanism rotated by said crank shaft constantly, steam cut-off means, a pilot valve hydraulically actuated from said housing for timing said valve mechanism to cause it to control said steam cut-off means, a pressure-flow line leading from said compressor plant, an oil pressure line maintaining the hydraulic efficacy of the pilot valve, a steam throttle control valve automatically controlled by said pilot valve, under influence of the steam cut-off control hand lever for rendering said pilot valve active, means responsive to variations of the pressure flow line for controlling said cut-off control lever, and means responsive to variations in the oil pressure line for controlling said pilot valve.

11. In a compressor power plant, steam propulsive means therefor including a main crank shaft, a housing, an auxiliary crank shaft in said housing, means injecting under constant oil pressure oil through said housing for pressure against said auxiliary crank shaft, steam cut-off means engaged by said auxiliary crank shaft, as it rotates, means rotating said auxiliary crank shaft from the main crank shaft, a pressure flow line leading from the compressor plant, a pilot valve for opening the flow of oil to press said auxiliary crank shaft, means operated by said auxiliary crank shaft as it is pressed upon by said oil for timing the steam cut-off means variably, and means responsive to variations of pressure in said pressure flow line for controlling said pilot valve.

12. In a compound engine drive, in combination a steam cut-off mechanism, a housing containing oil under pressure, variations in the pressure of said oil influencing operation of said steam cut-off mechanism, a crank shaft having an eccentric device timing the operation of said steam cut-off mechanism, said crank shaft having secured thereto a pair of pistons on opposing sides of said eccentric device, means admitting oil from said housing into engagement with either of said pistons selectively whereby the oil under pressure in said housing reacting against one piston moves the crank shaft in one direction, and reacting against the other piston moves it in a counter direction, for rendering said eccentric device active, to time the operation of said steam cut-off mechanism, an eccentric pin connecting the crank shaft in said housing with the eccentric device, an injection nozzle projecting into one end of the housing, means for injecting a lubricating oil from said nozzle into the eccentric pin, eccentric device and through both of the pistons, and an oil draining means for said housing at the other end thereof.

13. In a compound engine drive, in combination, an auxiliary housing, a line of oil flow under pressure in said housing, a line of gas flow under pressure, means operated by said engine drive for generating said line of gas flow, a crank shaft slidably mounted in said housing, steam cut-off means for said engine drive, means whereby variation of the cut-off means is controlled through sliding movement of said crank shaft effected by the oil under pressure in said housing, a coupling on said crank shaft for varying the position thereof to control its steam cut-off influence, and means responsive to variations in pressure of said line of gas flow for operating said coupling on the crank shaft.

HERMAN G. MUELLER.

REFERENCES CITED

The following references are of record in the file of this patent:

UNITED STATES PATENTS

| Number | Name | Date |
| --- | --- | --- |
| 287,104 | Cullingworth | Oct. 23, 1883 |
| 521,675 | Schneider | June 19, 1894 |
| 626,652 | Dean | June 6, 1899 |
| 634,389 | Brotherhood | Oct. 3, 1899 |
| 640,330 | Selfe | Jan. 2, 1900 |
| 686,427 | Sugg | Nov. 12, 1901 |
| 1,008,519 | Barr | Nov. 14, 1911 |
| 1,308,001 | Dake | June 24, 1919 |
| 1,393,736 | Armstrong | Oct. 18, 1921 |
| 2,220,702 | Blank | Nov. 5, 1940 |
| 2,295,962 | Mueller | Sept. 15, 1942 |